(12) United States Patent
Frick et al.

(10) Patent No.: US 11,334,082 B2
(45) Date of Patent: May 17, 2022

(54) AUTONOMOUS MACHINE NAVIGATION AND TRAINING USING VISION SYSTEM

(71) Applicant: THE TORO COMPANY, Bloomington, MN (US)

(72) Inventors: Alexander Steven Frick, Farmington, MN (US); Jason Thomas Kraft, Stillwater, MN (US); Ryan Douglas Ingvalson, Loretto, MN (US); Christopher Charles Osterwood, Exeter, NH (US); David Arthur LaRose, Pittsburgh, PA (US); Zachary Irvin Parker, Pittsburgh, PA (US); Adam Richard Williams, Mountain View, CA (US); Stephen Paul Elizondo Landers, Pittsburgh, PA (US); Michael Jason Ramsay, Verona, PA (US); Brian Daniel Beyer, Pittsburgh, PA (US)

(73) Assignee: THE TORO COMPANY, Bloomington, MN (US)

( * ) Notice: Subject to any disclaimer, the term of this patent is extended or adjusted under 35 U.S.C. 154(b) by 248 days.

(21) Appl. No.: 16/534,515

(22) Filed: Aug. 7, 2019

(65) Prior Publication Data
US 2020/0050208 A1  Feb. 13, 2020

Related U.S. Application Data

(60) Provisional application No. 62/818,893, filed on Mar. 15, 2019, provisional application No. 62/741,988,
(Continued)

(51) Int. Cl.
*G05D 1/02* (2020.01)
*G05D 1/00* (2006.01)
(Continued)

(52) U.S. Cl.
CPC ......... *G05D 1/0221* (2013.01); *A01D 34/008* (2013.01); *A01D 34/824* (2013.01);
(Continued)

(58) Field of Classification Search
CPC .. G05D 1/0221; G05D 1/0088; G05D 1/0246; G05D 1/027; G05D 1/0274;
(Continued)

(56) References Cited

U.S. PATENT DOCUMENTS

| 7,054,716 B2 | 5/2006 | McKee et al. |
| 8,938,318 B2 | 1/2015 | Bergstrom et al. |

(Continued)

FOREIGN PATENT DOCUMENTS

| DE | 102007060056 A1 | 6/2009 |
| EP | 2006708 A1 | 12/2008 |

(Continued)

OTHER PUBLICATIONS

Ackerman, iRobot Finally Announces Awesome New Terra Robotic Lawnmower, Jan. 30, 2019, www.spectrum.ieee.org./automation/orobotics/home-robots/irobot-terra-robotic-lawnmower, 6 pages, printed Mar. 5, 2019.

(Continued)

*Primary Examiner* — Khoi H Tran
*Assistant Examiner* — Shahzab Hussain Shah
(74) *Attorney, Agent, or Firm* — Mueting Raasch Group

(57) ABSTRACT

Autonomous machine navigation techniques may generate a three-dimensional point cloud that represents at least a work region based on feature data and matching data. Pose data associated with points of the three-dimensional point cloud may be generated that represents poses of an autonomous machine. A boundary may be determined using the pose data for subsequent navigation of the autonomous machine in the work region. Non-vision-based sensor data may be used to
(Continued)

determine a pose. The pose may be updated based on the vision-based pose data. The autonomous machine may be navigated within the boundary of the work region based on the updated pose. The three-dimensional point cloud may be generated based on data captured during a touring phase. Boundaries may be generated based on data captured during a mapping phase.

28 Claims, 24 Drawing Sheets

Related U.S. Application Data filed on Oct. 5, 2018, provisional application No. 62/716,716, filed on Aug. 9, 2018, provisional application No. 62/716,208, filed on Aug. 8, 2018.

(51) Int. Cl.

| | | |
|---|---|---|
| *G01C 21/32* | (2006.01) | |
| *A01D 34/00* | (2006.01) | |
| *A01D 34/82* | (2006.01) | |
| *A01D 34/69* | (2006.01) | |
| *A01D 34/78* | (2006.01) | |
| *A01D 101/00* | (2006.01) | |

(52) U.S. Cl.
CPC ........... *G01C 21/32* (2013.01); *G05D 1/0061* (2013.01); *G05D 1/0088* (2013.01); *G05D 1/027* (2013.01); *G05D 1/0246* (2013.01); *G05D 1/0274* (2013.01); *A01D 34/69* (2013.01); *A01D 34/78* (2013.01); *A01D 2101/00* (2013.01); *G05D 2201/0208* (2013.01)

(58) Field of Classification Search
CPC ........... G05D 2201/0208; G01C 21/32; G06K 9/00664; G06K 9/4671; G06K 9/6211; G06K 9/00201; A01D 34/824; A01D 34/008
See application file for complete search history.

(56) References Cited

U.S. PATENT DOCUMENTS

| | | | |
|---|---|---|---|
| 8,958,939 B2 | 2/2015 | Einecke et al. | |
| 9,383,753 B1 | 7/2016 | Templeton et al. | |
| 9,497,901 B2 | 11/2016 | Nelson et al. | |
| 9,888,625 B2 | 2/2018 | Yamamura | |
| 10,222,211 B2 * | 3/2019 | Chen ................ | G06T 7/248 |
| 10,315,306 B2 * | 6/2019 | Abramson ........... | G05D 1/0246 |
| 10,328,930 B2 * | 6/2019 | Abe ................ | B60L 53/80 |
| 10,338,602 B2 | 7/2019 | Grufman et al. | |
| 10,405,488 B2 | 9/2019 | Kamfors et al. | |
| 10,643,377 B2 | 5/2020 | Grufman et al. | |
| 10,649,466 B2 | 5/2020 | Holmstrom et al. | |
| 10,705,533 B1 * | 7/2020 | Bishel ................ | G05D 1/0231 |
| 2005/0273967 A1 | 12/2005 | Taylor | |
| 2008/0109126 A1 | 5/2008 | Sandin et al. | |
| 2011/0153136 A1 | 6/2011 | Anderson | |
| 2012/0025851 A1 | 2/2012 | Homeijer | |
| 2014/0043436 A1 | 2/2014 | Bell et al. | |
| 2014/0121881 A1 | 5/2014 | Diazdelcastillo | |
| 2015/0201555 A1 | 7/2015 | Willgert | |
| 2015/0220086 A1 | 8/2015 | Willgert | |
| 2015/0250097 A1 | 9/2015 | Jagenstedt et al. | |
| 2015/0271991 A1 | 10/2015 | Balutis | |
| 2015/0366130 A1 | 12/2015 | Bergstrom et al. | |
| 2015/0366137 A1 | 12/2015 | Markusson et al. | |
| 2016/0259341 A1 * | 9/2016 | High ................ | H04W 4/33 |
| 2016/0278285 A1 | 9/2016 | Reigo | |
| 2016/0297070 A1 | 10/2016 | Reigo et al. | |
| 2016/0334795 A1 | 11/2016 | Reigo et al. | |
| 2017/0031360 A1 | 2/2017 | Reigo et al. | |
| 2017/0031368 A1 | 2/2017 | Reigo et al. | |
| 2017/0108872 A1 | 4/2017 | Mannefred et al. | |
| 2017/0109611 A1 * | 4/2017 | Luo ................ | G06K 9/6262 |
| 2017/0127607 A1 | 5/2017 | Mannefred et al. | |
| 2017/0139419 A1 | 5/2017 | Jagenstedt et al. | |
| 2017/0188510 A1 | 7/2017 | Einecke et al. | |
| 2017/0303466 A1 | 10/2017 | Grufman et al. | |
| 2017/0344012 A1 | 11/2017 | Kamfors et al. | |
| 2017/0344024 A1 | 11/2017 | Grufman et al. | |
| 2017/0347521 A1 | 12/2017 | Tjernberg et al. | |
| 2017/0357006 A1 | 12/2017 | Ohrlund et al. | |
| 2017/0364088 A1 | 12/2017 | Grufman et al. | |
| 2017/0364090 A1 | 12/2017 | Grufman et al. | |
| 2017/0372514 A1 | 12/2017 | Grufman et al. | |
| 2018/0103579 A1 | 4/2018 | Grufman et al. | |
| 2018/0129199 A1 | 5/2018 | Gustavsson et al. | |
| 2018/0139896 A1 | 5/2018 | Wahlgren | |
| 2018/0213731 A1 | 8/2018 | Wykman et al. | |
| 2018/0253096 A1 | 9/2018 | Holgersson et al. | |
| 2018/0255704 A1 | 9/2018 | Kamfors et al. | |
| 2018/0348790 A1 | 12/2018 | Reigo | |
| 2018/0364735 A1 | 12/2018 | Holmstrom et al. | |
| 2019/0025847 A1 * | 1/2019 | Mannefred .......... | A01D 34/008 |
| 2019/0026956 A1 | 1/2019 | Gausebeck et al. | |
| 2019/0294914 A1 * | 9/2019 | Fevold ................ | G06V 10/446 |
| 2020/0005486 A1 * | 1/2020 | Sinha ................ | G06T 7/74 |
| 2020/0309534 A1 * | 10/2020 | Chen ................ | G05D 1/0274 |
| 2021/0064036 A1 | 3/2021 | Muro et al. | |
| 2021/0157334 A1 * | 5/2021 | Zhou ................ | A01D 34/008 |

FOREIGN PATENT DOCUMENTS

| | | |
|---|---|---|
| EP | 2926642 A1 | 10/2015 |
| EP | 3018548 | 5/2016 |
| EP | 2873587 B1 | 8/2016 |
| EP | 3168705 | 5/2017 |
| EP | 3175693 A1 | 6/2017 |
| EP | 2884364 B1 | 9/2018 |
| EP | 3236732 B1 | 12/2019 |
| GB | 2277152 A | 10/1994 |
| JP | 2002-181560 A | 6/2002 |
| WO | WO 2007/109624 A2 | 9/2007 |
| WO | WO 2011/115534 A1 | 9/2011 |
| WO | WO 2014/027946 A1 | 2/2014 |
| WO | WO 2015/172831 A1 | 11/2015 |
| WO | WO 2016/097891 A1 | 6/2016 |
| WO | WO 2016/097896 A1 | 6/2016 |
| WO | WO 2016/097900 A1 | 6/2016 |
| WO | WO 2016/098040 A1 | 6/2016 |
| WO | WO 2016/098050 A1 | 6/2016 |
| WO | WO 2016/099616 A1 | 6/2016 |
| WO | WO 2016/103067 A1 | 6/2016 |
| WO | WO 2016/103068 A1 | 6/2016 |
| WO | WO 2016/103070 A1 | 6/2016 |
| WO | WO 2016/103071 A1 | 6/2016 |
| WO | WO 2017/004517 A1 | 1/2017 |
| WO | WO 2017/123137 A1 | 7/2017 |
| WO | 2018/001358 | 1/2018 |
| WO | WO 2019/096262 A1 | 5/2019 |
| WO | WO 2019/096263 A1 | 5/2019 |
| WO | WO 2019/096264 A1 | 5/2019 |
| WO | 2019/180765 | 9/2019 |

OTHER PUBLICATIONS

International Search Report and Written Opinion for PCT/US2019/045443 dated Apr. 6, 2020, 14 pages.
International Preliminary Report on Patentability for PCT/US2019/045443 dated Sep. 28, 2020, 7 pages.
International Search Report and Written Opinion for PCT/US2019/045470 dated Feb. 14, 2020, 16 pages.
Maeyama et al., Long distance outdoor navigation of an autonomous mobile robot by playback of perceived route map. (1998), In: Casals A., de Almeida A.T. (eds) Experimental Robotics V. Lecture Notes in Control and Information Sciences, vol. 232.

(56) References Cited

OTHER PUBLICATIONS

Maeyama et al., Outdoor landmark map generation through human assisted route teaching for mobile robot navigation, 1996, Proc. IROS 96, p. 957-962.
Press Release: Zucchetti Centro Sistemi, "The New Range of Robotic Lawnmowers is born, Super Smart with Artificial Intelligence", Jan. 30, 2019, www.zcscompany.com/en/press/id/nasce-la-nuova-gamma-di-robot-rasaerba-super-smart-con-lintelligenza-artifi, 11 pages, printed Mar. 5, 2019.
Stentz, Robotic technologies for outdoor industrial vehicles, Sep. 2001, Proc. SPIE 4364, Unmanned Ground Vehicle Technology III.
Yang et al., Vision-Based Localization and Mapping for Autonomous Mower, Nov. 3-7, 2013, IEEE/RSJ International Conference on Intelligent Robots and Systems (IROS), Tokyo, Japan, pp. 3655-3662.
Chenavier et al., "Position Estimation for a Mobile Robot Using Vision and Odometry" Proceedings of the 1992 IEEE, International Conference on Robotics and Automation. Nice, France. May 1992. Retrieved on the internet on Mar. 1, 2022: cyphynets.lums.edu.pk/images/Vision_localization_paper.pdf 6 pages.
Communication Pursuant to Rule 114(2) EPC dated Mar. 1, 2022, EP Application No. 19755504.8. 8 pages.
Third party observations for European Patent Application No. 19755504.8 dated Feb. 7, 2022, 18 pages.

* cited by examiner

AUTONOMOUS MACHINE NAVIGATION AND TRAINING USING VISION SYSTEM

The present application claims the benefit of U.S. Provisional Patent Application Nos. 62/716,208, filed Aug. 8, 2018; 62/716,716, filed Aug. 9, 2018; 62/741,988, filed Oct. 5, 2018; and 62/818,893, filed Mar. 15, 2019, all of which are incorporated herein by reference in their respective entireties.

The present disclosure relates to autonomous machine navigation. In particular, the present disclosure relates to autonomous machine navigation for grounds maintenance machines.

Grounds maintenance machines, such as lawn and garden machines, are known for performing a variety of tasks. For instance, powered lawn mowers are used by both homeowners and professionals alike to maintain grass areas within a property or yard. Lawn mowers that autonomously perform the grass cutting function are also known. Some lawn mowers will operate in a work region within a predefined boundary. Such lawn mowers may rely upon navigation systems that help the lawn mower autonomously stay within the predefined boundary. For example, some boundaries are defined by wires, which are detected by the mower. The mower navigates by moving randomly within the boundary and redirect its trajectory upon detecting the boundary wire. Using boundary wires may be undesirable for some work regions or some autonomous maintenance tasks. For example, the boundary wire may be costly and cumbersome to install, may break and become inoperable, or may be difficult to move to redefine a desirable boundary for the work region. However, the mobile nature of lawn mowers has limited the available computing resources, such as processing power, memory capabilities, and battery life, available to the lawn mower for other, more sophisticated types of navigation.

SUMMARY

Embodiments of the present disclosure relate to navigation for autonomous machines, particularly to autonomously navigate and operate within a boundary of a work region, and even more particularly may be suitable for autonomous machines with limited computing resources. The techniques of the present disclosure provide a robust process for training an autonomous machine for navigation in a work region.

In one aspect, a method for autonomous machine navigation includes determining a current pose of an autonomous machine based on non-vision-based pose data captured by one or more non-vision-based sensors of the autonomous machine. The pose represents one or both of a position and an orientation of the autonomous machine in a work region defined by one or more boundaries. The method also includes determining vision-based pose data based on image data captured by the autonomous machine. The method further includes updating the current pose based on the vision-based pose data to correct or localize the current pose and to provide an updated pose of the autonomous machine in the work region for navigating the autonomous machine in the work region.

In another aspect, an autonomous machine includes a housing coupled to a maintenance implement; a set of wheels supporting the housing over a ground surface; a propulsion controller operably coupled to the set of wheels; a vision system having at least one camera adapted to capture image data; and a navigation system operably coupled to the vision system and the propulsion controller. The navigation system is adapted to direct the autonomous machine within the work region. The navigation system may be configured to determine a current pose of an autonomous machine based on non-vision-based pose data captured by one or more non-vision-based sensors of the autonomous machine. The pose represents one or both of a position and an orientation of the autonomous machine in the work region defined by one or more boundaries. The navigation system may be configured to include determining vision-based pose data based on image data captured by the at least one camera. The navigation system may be configured to update the current pose based on the vision-based pose data to correct or localize the current pose and to provide an updated pose of the autonomous machine in the work region for navigating the autonomous machine in the work region.

In yet another aspect, a method of navigation training for an autonomous machine may include directing the autonomous machine during a touring phase of a training mode along at least one of a perimeter or an interior of a work region to record a first set of touring images associated with the perimeter or a second set of touring images associated with the interior; generating during an offline mode a three-dimensional point cloud (3DPC) based on at least one of the first set and the second set of touring images; and directing the autonomous machine during a mapping phase of the training mode along one or more paths to record sensor fusion data to define one or more boundaries for the work region in a navigational map.

The summary is not intended to describe each embodiment or every implementation of the present disclosure. A more complete understanding will become apparent and appreciated by reference to the following detailed description and claims taken in view of the accompanying figures of the drawing.

BRIEF DESCRIPTION OF THE DRAWINGS

Illustrative embodiments will be further described with reference to the figures of the drawing, wherein.

Figure 1:
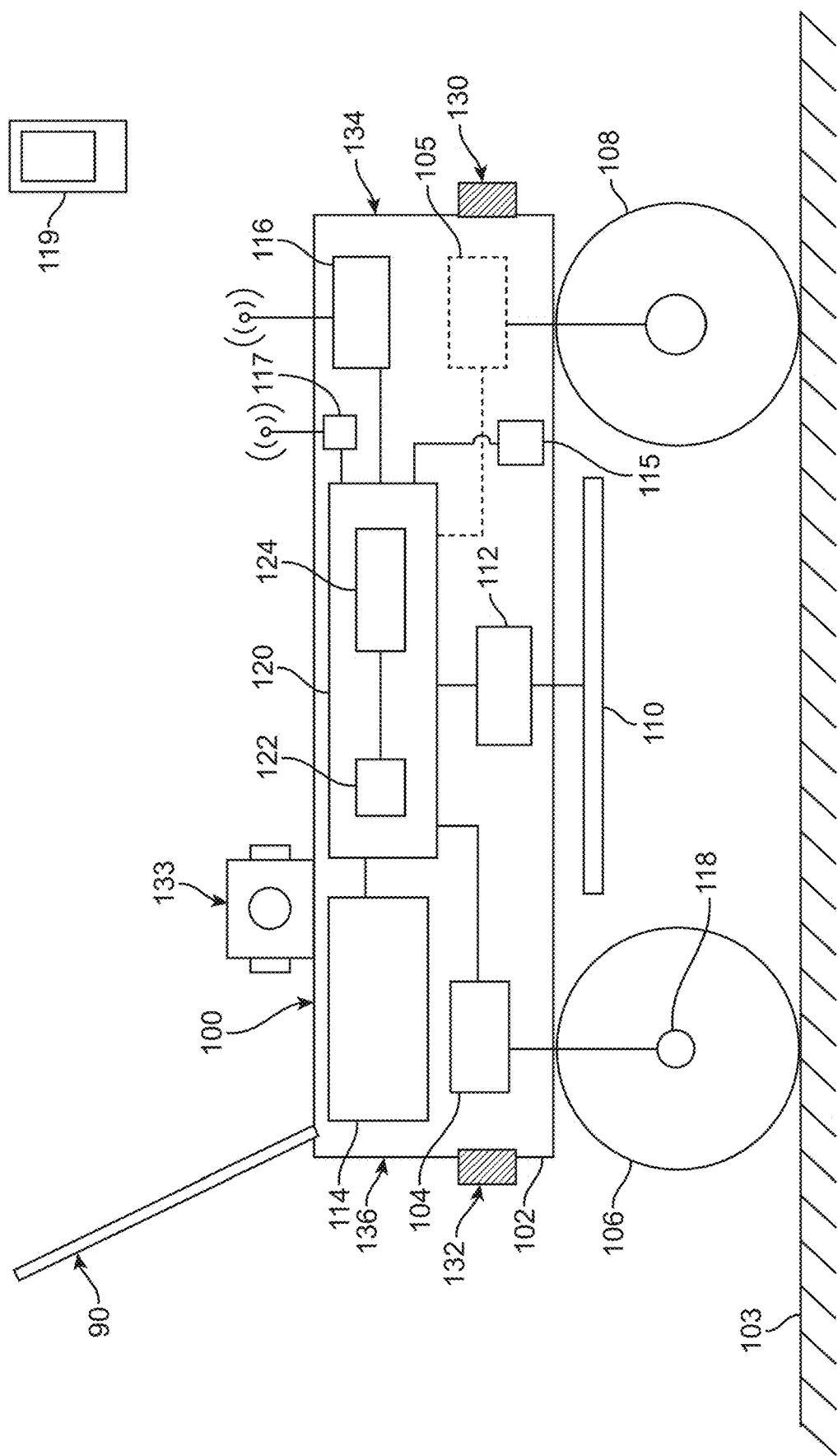
FIG. 1 is a diagrammatic elevation side view of an autonomous grounds maintenance machine with a vision system in accordance with one embodiment of the present disclosure.

The figures are rendered primarily for clarity and, as a result, are not necessarily drawn to scale. Moreover, various structure/components, including but not limited to fasteners, electrical components (wiring, cables, etc.), and the like, may be shown diagrammatically or removed from some or all of the views to better illustrate aspects of the depicted embodiments, or where inclusion of such structure/components is not necessary to an understanding of the various illustrative embodiments described herein. The lack of illustration/description of such structure/components in a particular figure is, however, not to be interpreted as limiting the scope of the various embodiments in any way.

DETAILED DESCRIPTION

In the following detailed description of illustrative embodiments, reference is made to the accompanying figures of the drawing which form a part hereof. It is to be understood that other embodiments, which may not be described and/or illustrated herein, are certainly contemplated.

All headings provided herein are for the convenience of the reader and should not be used to limit the meaning of any text that follows the heading, unless so specified. Moreover, unless otherwise indicated, all numbers expressing quantities, and all terms expressing direction/orientation (e.g., vertical, horizontal, parallel, perpendicular, etc.) in the specification and claims are to be understood as being modified in all instances by the term "about." The term "and/or" (if used) means one or all of the listed elements or a combination of any two or more of the listed elements. The term "i.e." is used as an abbreviation for the Latin phrase id est and means "that is." The term "e.g.," is used as an abbreviation for the Latin phrase exempli gratia and means "for example."

Embodiments of the present disclosure provide autonomous machine navigation methods and systems to autonomously navigate and operate within a boundary of a work region, particularly for grounds maintenance, such as lawn mowing. The autonomous machine may be configured in different modes to carry out various navigation functionality, such as training mode, offline mode, and online mode. The autonomous machine may define one or more boundaries of a work region using a vision system and a non-vision-based sensor, for example, instead of using a boundary wire. The autonomous machine may correct a position or orientation within the work region, which is determined or estimated using one or more non-vision-based sensors, by using a position or orientation determined the vision system. Training the autonomous machine may be performed during a training mode, which may include one or more phases, such as a touring phase and a mapping phase.

Some aspects described herein relate to defining a boundary of a work region using a vision system and a non-vision-based sensor. Some aspects of the present disclosure relate to correcting an estimated position within the work region using a vision system. The vision system may utilize one or more cameras. Images may be recorded by directing the autonomous machine along a desired boundary path (e.g., during a training mode). Algorithms may be used to extract features, to match features between different images, and to generate a three-dimensional point cloud (3DPC, or 3D point cloud) corresponding to at least the work region (e.g., during an offline mode). Positions and orientations of the autonomous machine during image recording may be determined for various points in the 3DPC, for example, based on the positions of various points in the 3DPC and positions of the corresponding features in the recorded images. Positions and orientations may also be recovered directly during generation of the point cloud. At least the position information may be used to determine a boundary for the work region for subsequent navigation of the autonomous machine in the work region. During operation (e.g., during an online mode), the vision machine may record operational images and determine a vision-based position and orientation of the autonomous machine. The vision-based position may be used to update, or correct errors in, a determined or estimated position based on non-vision-based sensors. Various aspects described herein relate to utilizing limited computing resources while achieving suitable navigation of the work region. The processing of recorded images may occur during an offline mode, for example, when the autonomous machine is charging overnight. The vision system may be used at a low refresh rate to complement a high refresh rate non-vision-based navigation system.

While described herein in illustrative examples as an autonomous mower, such a configuration is illustrative only as systems and methods described herein also have application to other autonomous machines including, for example, commercial mowing products (e.g., riding fairway or greens mowers that are driven by a user), other ground working machines or vehicles (e.g., debris blowers/vacuums, aerators, dethatchers, material spreaders, snow throwers, weeding machines for weed remediation), indoor working vehicles such as vacuums and floor scrubbers/cleaners (e.g., that may encounter obstacles), construction and utility vehicles (e.g., trenchers), observation vehicles, and load transportation (e.g., including people and things, such as people movers and hauling equipment). Furthermore, the autonomous machines described herein may employ various one or more types of navigation, such as random, modified random, or specific path planning, to carry out their intended functionality.

It is noted that the terms "have," "include," "comprises," and variations thereof, do not have a limiting meaning, and are used in their open-ended sense to generally mean "including, but not limited to," where the terms appear in the accompanying description and claims. Further, "a," "an," "the," "at least one," and "one or more" are used interchangeably herein. Moreover, relative terms such as "left," "right," "front," "fore," "forward," "rear," "aft," "rearward," "top," "bottom," "side," "upper," "lower," "above," "below," "horizontal," "vertical," and the like may be used herein and, if so, are from the perspective shown in the particular figure, or while the machine 100 is in an operating configuration (e.g., while the machine 100 is positioned such that wheels 106 and 108 rest upon a generally horizontal ground surface 103 as shown in FIG. 1). These terms are used only to simplify the description, however, and not to limit the interpretation of any embodiment described.

As used herein, the terms "determine" and "estimate" may be used interchangeably depending on the particular context of their use, for example, to determine or estimate a position or pose of the mower 100 or a feature.

While the construction of the actual grounds maintenance machine is not necessarily central to an understanding of embodiments of this disclosure, FIG. 1 illustrates one example of an autonomous grounds maintenance machine (e.g., an autonomously operating vehicle, such as an autonomous lawn mower 100) of a lawn mowing system (for simplicity of description, the mower 100 is illustrated schematically). As shown in this view, the mower 100 may include a housing 102 (e.g., frame or chassis with a shroud) that carries and/or encloses various components of the mower as described below. The mower 100 may further include ground support members, such as wheels, rollers, or tracks. In the illustrated embodiment, ground support members shown includes one or more rear wheels 106 and one or more front wheels 108, that support the housing 102 upon a ground (grass) surface 103. As illustrated, the front wheels 108 are used to support a front end portion 134 of the mower housing 102 and the rear wheels 106 are used to support the rear end portion 136 of the mower housing.

One or both rear wheels 106 may be driven by a propulsion system (e.g., including one or more electric wheel motors 104) to propel the mower 100 over the ground surface 103. In some embodiments, the front wheels 108 may freely caster relative to the housing 102 (e.g., about vertical axes). In such a configuration, mower direction may be controlled via differential rotation of the two rear wheels 106 in a manner similar to a conventional zero-turn-radius (ZTR) riding mower. That is to say, the propulsion system may include a separate wheel motor 104 for each of a left and right rear wheel 106 so that speed and direction of each rear wheel may be independently controlled. In addition, or alternatively, the front wheels 108 could be actively steerable by the propulsion system (e.g., including one or more steer motors 105) to assist with control of mower 100 direction, and/or could be driven by the propulsion system (i.e., to provide a front-wheel or all-wheel drive mower).

An implement (e.g., a grass cutting element, such as a blade 110) may be coupled to a cutting motor 112 (e.g., implement motor) carried by the housing 102. When the motors 112 and 104 are energized, the mower 100 may be propelled over the ground surface 103 such that vegetation (e.g., grass) over which the mower passes is cut by the blade 110. While illustrated herein using only a single blade 110 and/or motor 112, mowers incorporating multiple blades, powered by single or multiple motors, are contemplated within the scope of this disclosure. Moreover, while described herein in the context of one or more conventional "blades," other cutting elements including, for example, disks, nylon string or line elements, knives, cutting reels, etc., are certainly possible without departing from the scope of this disclosure. Still further, embodiments combining various cutting elements, e.g., a rotary blade with an edge-mounted string trimmer, are also contemplated.

The mower 100 may further include a power source, which in one embodiment, is a battery 114 having a lithium-based chemistry (e.g., lithium-ion). Other embodiments may utilize batteries of other chemistries, or other power source technologies (e.g., solar power, fuel cell, internal combustion engines) altogether, without departing from the scope of this disclosure. It is further noted that, while shown as using independent blade and wheel motors, such a configuration is illustrative only as embodiments wherein blade and wheel power is provided by a single motor are also contemplated.

The mower 100 may further include one or more sensors to provide location data. For instance, some embodiments may include a global positioning system (GPS) receiver 116 (or other position sensor that may provide similar data) that is adapted to estimate a position of the mower 100 within a work region and provide such information to a controller 120 (described below). In other embodiments, one or more of the wheels 106, 108 may include encoders 118 that provide wheel rotation/speed information that may be used to estimate mower position (e.g., based upon an initial start position) within a given work region. The mower 100 may also include a sensor 115 adapted to detect a boundary wire, which could be used in addition to other navigational techniques described herein.

The mower 100 may include one or more front obstacle detection sensors 130 and one or more rear obstacle detection sensors 132, as well as other sensors, such as side obstacle detection sensors (not shown). The obstacle detection sensors 130, 132 may be used to detect an obstacle in the path of the mower 100 when travelling in a forward or reverse direction, respectively. The mower 100 may be capable of mowing while moving in either direction. As illustrated, the sensors 130, 132 may be located at the front end portion 134 or rear end portion 136 of the mower 100, respectively.

The sensors 130, 132 may use contact sensing, non-contact sensing, or both types of sensing. For example, both contact and non-contact sensing may be enabled concurrently or only one type of sensing may be used depending on the status of the mower 100 (e.g., within a zone or travelling between zones). One example of contact sensing includes using a contact bumper protruding from the housing 102, or the housing itself, that can detect when the mower 100 has contacted the obstacle. Non-contact sensors may use acoustic or light waves to detect the obstacle, sometimes at a distance from the mower 100 before contact with the obstacle (e.g., using infrared, radio detection and ranging (radar), light detection and ranging (lidar), etc.).

The mower 100 may include one or more vision-based sensors to provide localization data, such as position, orientation, or velocity. The vision-based sensors may include one or more cameras 133 that capture or record images for use with a vision system. The cameras 133 may be described as part of the vision system of the mower 100. Types of images include, for example, training images and/or operational images.

The one or more cameras may be capable of detecting visible light, non-visible light, or both. The one or more cameras may establish a total field of view of at least 30 degrees, at least 45 degrees, at least 60 degrees, at least 90 degrees, at least 120 degrees, at least 180 degrees, at least 270 degrees, or even at least 360 degrees, around the autonomous machine (e.g., mower 100). The field of view may be defined in a horizontal direction, a vertical direction, or both directions. For example, a total horizontal field of view may be 360 degrees, and a total vertical field of view may be 45 degrees. The field of view may capture image data above and below the height of the one or more cameras.

In some embodiments, the mower 100 includes four cameras 133. One camera 133 may be positioned in each of one or more of directions including a forward direction, a reverse direction, a first side direction, and a second side direction (e.g., Cardinal directions relative to the mower 100). One or more camera directions may be positioned orthogonal to one or more other cameras 133 or positioned opposite to at least one other camera 133. The cameras 133 may also be offset from any of these directions (e.g., at a 45 degree or another non-right angle).

The mower 100 may be guided along a path, for example, in a manual manner using handle assembly 90. In particular, manual direction of the mower 100 may be used during a training mode to learn a work region or a boundary associated with the work region. The handle assembly 90 may extend outward and upward from a rear end portion 136 of the mower 100.

The camera 133 positioned in a forward direction may have a pose that represents the pose of the autonomous machine. The pose may be a six-degrees of freedom pose, which may include all position and orientation parameters for a three-dimensional space (see also description related to FIG. 6). In some embodiments, the position and orientation of the cameras may be defined relative to a geometric center of the mower 100 or relative to one of the edges of the mower 100.

Sensors of the mower 100 may also be described as either vision-based sensors and non-vision-based sensors. Vision-based sensors may include cameras 133 that are capable of recording images. The images may be processed and used to build a 3DPC or used for optical odometry (e.g., optical encoding). Non-vision-based sensors may include any sensors that are not cameras 133. For example, a wheel encoder that uses optical (e.g., photodiode), magnetic, or capacitive sensing to detect wheel revolutions may be described as a non-vision-based sensor that does not utilize a camera. Wheel encoding data from a wheel encoder may be also described as odometry data. In some embodiments, non-vision-based sensors do not include a boundary wire detector. In some embodiments, non-vision-based sensors do not include receiving signals from external system, such as from a GPS satellite or other transceiver.

Optical encoding may be used by taking a series or sequence of images and comparing features in the images to determine or estimate a distance traveled between the images. Optical encoding may be less susceptible to wheel slippage than a wheel encoder for determining distance or speed.

In addition to the sensors described above, other sensors now known or later developed may also be incorporated into the mower 100.

The mower 100 may also include a controller 120 adapted to monitor and control various mower functions. The controller 120 may include a processor 122 that receives various inputs and executes one or more computer programs or applications stored in memory 124. The memory 124 may include computer-readable instructions or applications that, when executed, e.g., by the processor 122, cause the controller 120 to perform various calculations and/or issue commands. That is to say, the processor 122 and memory 124 may together define a computing apparatus operable to process input data and generate the desired output to one or more components/devices. For example, the processor 122 may receive various input data including positional data from the GPS receiver 116 and/or encoders 118 and generate speed and steering angle commands to the one or more wheel motors 104 to cause the drive wheels 106 to rotate (at the same or different speeds and in the same or different directions). In other words, the controller 120 may control the steering angle and speed of the mower 100, as well as the speed and operation of the cutting blade.

In general, GPS data generated based on data from the GPS receiver 116 (FIG. 1) may be used in various ways to facilitate the determining a pose of the mower 100. In some embodiments, GPS data may be used as one of the non-vision-based sensors to help determine non-vision-based pose data. The non-vision-based pose data may be updated or corrected using vision-based pose data. GPS data may also be used to facilitate updating or correcting an estimated pose, which may be based on non-vision-based pose data and/or vision-based pose data. In some embodiments, the GPS data may be augmented using a GPS-specific correction data, such as real-time kinematics (RTK) data. GPS-RTK data may provide a more accurate or precise location that corrects for anomalies in GPS timing compared to nominal GPS data.

Reference herein may be made to various parameters, data, or data structures, which may be handled in a controller 120, for example, by being processed by a processor 122 or stored in or retrieved from a memory 124.

The controller 120 may use the processor 122 and memory 124 in various different systems. In particular, one or more processors 122 and memory 124 may be included in each different system. In some embodiments, the controller 120 may at least partially define a vision system, which may include a processor 122 and memory 124. The controller 120 may also at least partially define a navigation system, which may include a processor 122 and memory 124 separate from the processor 122 and memory 124 of the vision system.

Each system may also be described as having its own controller 120. For example, the vision system may be described as including one controller 120 and the navigation system may be described as having another controller 120.

As such, the mower 100 may be described as having multiple controllers 120. In general, as used herein, the term "controller" may be used to describe components of a "system" that provide commands to control various other components of the system.

In addition, the mower 100 may be in operative communication with a separate device, such as a smartphone or remote computer. A problem area or obstacle may be identified, or defined, using an application on the smartphone or remote computer, or the like. For example, a user may identify a problem area or obstacle on a map of a mowing area. One example of an obstacle is a permanent obstacle, such as a boulder. The mower 100 may receive the identified problem area or obstacle from the separate device. In such cases, the mower 100 may be configured to mow only in a certain direction through the problem area in response to receiving the identified problem area, or the mower may be configured to take proactive evasive maneuvers to avoid running into the obstacle while traversing a slope and may create an exclusion zone around a permanent obstacle in response to receiving the identified obstacle.

In view of the above, it will be readily apparent that the functionality of the controller 120 may be implemented in any manner known to one skilled in the art. For instance, the memory 124 may include any volatile, non-volatile, magnetic, optical, and/or electrical media, such as a random-access memory (RAM), read-only memory (ROM), non-volatile RAM (NVRAM), electrically-erasable programmable ROM (EEPROM), flash memory, and/or any other digital media. While shown as both being incorporated into the controller 120, the memory 124 and the processor 122 could be contained in separate modules.

The processor 122 may include any one or more of a microprocessor, a controller, a digital signal processor (DSP), an application specific integrated circuit (ASIC), a field-programmable gate array (FPGA), and/or equivalent discrete or integrated logic circuitry. In some embodiments, the processor 122 may include multiple components, such as any combination of one or more microprocessors, one or more controllers, one or more DSPs, one or more ASICs, and/or one or more FPGAs, as well as other discrete or integrated logic circuitry. The functions attributed to the controller 120 and/or processor 122 herein may be embodied as software, firmware, hardware, or any combination of these. Certain functionality of the controller 120 may also be performed in the cloud or other distributed computing systems operably connected to the processor 122.

In FIG. 1, schematic connections are generally shown between the controller 120 and the battery 114, one or more wheel motors 104, blade motor 112, optional boundary wire sensor 115, wireless radio 117, and GPS receiver 116. This interconnection is illustrative only as the various subsystems of the mower 100 could be connected in most any manner, e.g., directly to one another, wirelessly, via a bus architecture (e.g., controller area network (CAN) bus), or any other connection configuration that permits data and/or power to pass between the various components of the mower. Although connections with some of the sensors 130, 132, 133 are not shown, these sensors and other components of the mower 100 may be connected in a similar manner. The wireless radio 117 may communicate over a cellular or other wide area network (e.g., even over the internet), a local area network (e.g., IEEE 802.11 "Wi-Fi" radio), or a peer-to-peer (P2P) (e.g., BLUETOOTH™) network with a mobile device 119 (e.g., mobile computing device, mobile computer, handheld computing device, smartphone, cellular phone, tablet, desktop, or wearable computer, smartwatch, etc.). In turn, the mobile device 119 may communicate with other devices over similar networks and, for example, may be used to connect the mower 100 to the internet.

In some embodiments, various functionality of the controller or controllers 120 described herein may be offloaded from the mower 100. For example, recorded images may be transmitted to a remote server (e.g., in the cloud) using the wireless radio 117 and processed or stored. The images stored, or other data derived from processing, may be received using the wireless radio 117 and be stored on, or further processed by, the mower 100.

Figure 2A:
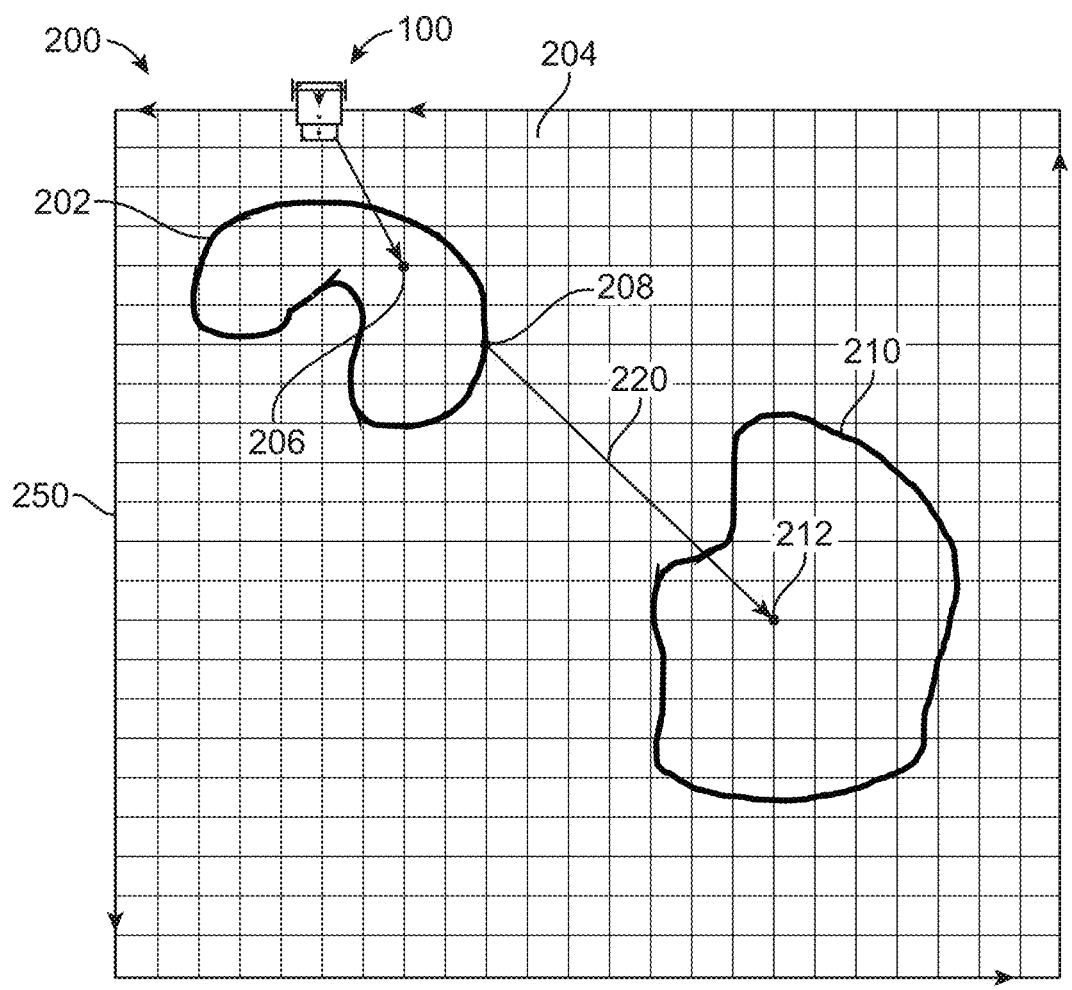
FIG. 2A is a plan view of a work region within a boundary that may be operated within using the machine of FIG. 1 in accordance with one embodiment of the present disclosure.
Figure 2B:
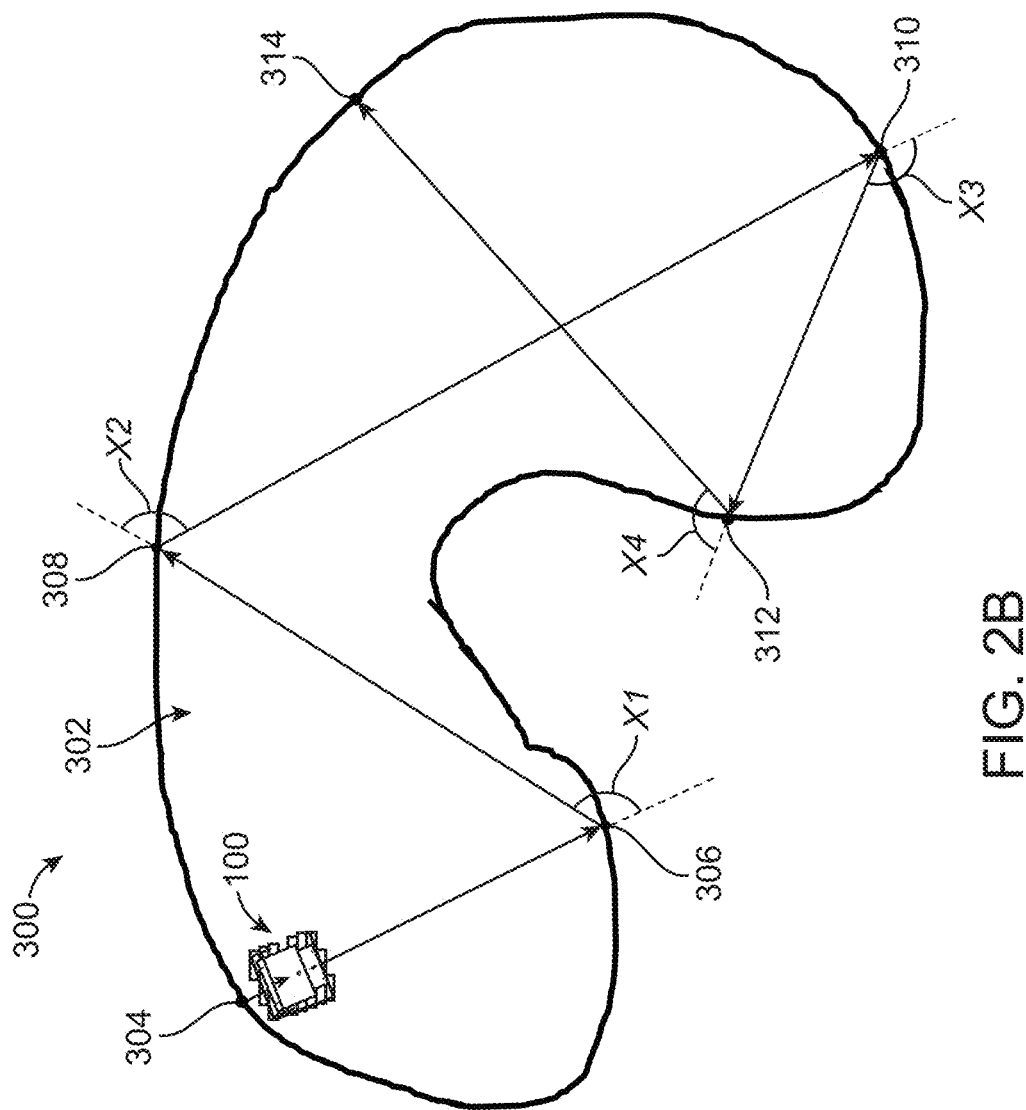
FIG. 2B is a plan view of a zone within the work region of FIG. 2A and an example of pathing of the machine of FIG. 1 within a boundary defining the zone in accordance with one embodiment of the present disclosure.
Figure 3:
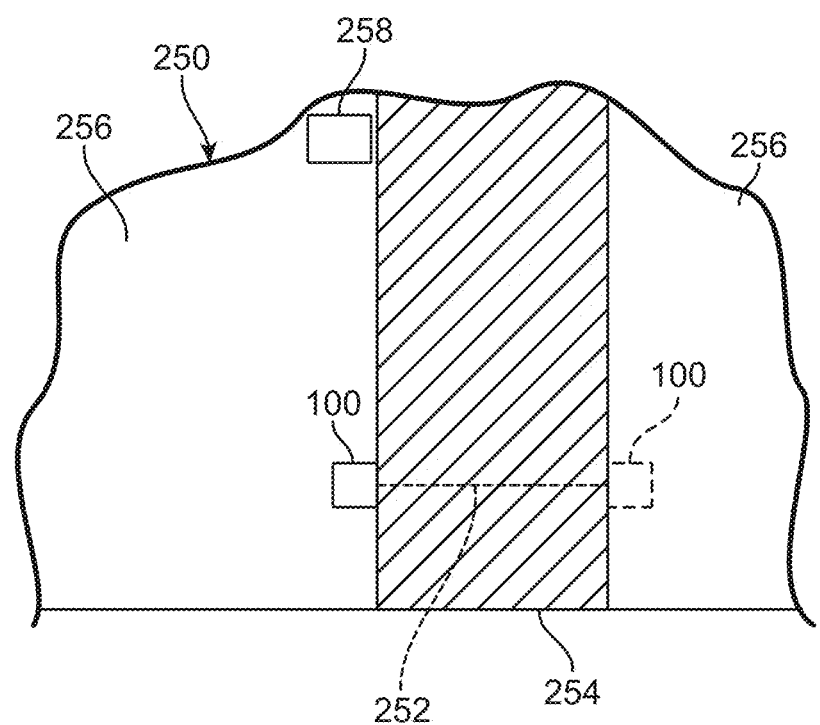
FIG. 3 is a plan view of a work region that includes an exclusion zone and a transit zone that may be operated within using the machine of FIG. 1 in accordance with one embodiment of the present disclosure.

FIGS. 2 and 3 show a work region 200 or a containment zone 202, 210 within the work region 200. A boundary may be defined, or determined, around the work region 200. The mower 100 may cover the work region 200 (e.g., traversed to mow the work region) using various methods. In some embodiments, the mower 100 may traverse random, semi-random, or planned paths within the work region 200. In some embodiments, other boundaries around the containment zones 202, 210 may be defined within the boundary of the work region 200 depending on the method used to cover the work region 200. For example, the containment zones 202, 210 may be travelling containment zones or static containment zones.

FIG. 2A shows one example of covering a work region 200 with the mower 100 using a plurality of zones 202, 210 (e.g., containment zones). The work region 200 may represent an outdoor area or maintenance area, such as a lawn. The mower 100 may be operated to travel through the work region 200 along a number of paths to sufficiently cut all the grass in the work region 200. The mower 100 may recharge as needed, for example, when transitioning between zones 202, 210. A recharging base or base station (similar to 258 at FIG. 3) may be located within or along the work region 200.

A boundary may be used to define the work region 200. The boundary may be defined manually, or automatically, using a training mode of the mower 100. In addition, some of the boundary may also be defined using a fixed property boundary or other type of boundary. In some embodiments, the boundary may be defined by directing the mower 100 along the work region 200, in particular, along a desired boundary path 250 of the work region 200.

Boundaries may be defined relative to the work region 200 for different purposes. For example, a boundary may be used to define a containment zone, such as for zone 202, zone 210, or work region 200. In general, the mower 100 may be directed to travel within a boundary for a containment zone for a period of time. Another boundary may be used to define an exclusion zone. An exclusion zone may represent an area of the work region 200 for the mower 100 to avoid or travel around. For example, an exclusion zone may contain an obstacle (such as a landscaped garden) or problem area (such as a steep slope). Another boundary may be used to define a transit zone, which may also be described as a transit path. In general, a transit zone is a zone connecting two other zones, such as a path connecting different containment zones. A transit zone may also be defined between a point in the work region and a "home" location or base station. A maintenance task may or may not be performed in the transit zone. For example, the mower 100 may not mow grass in a transit zone. In an example involving a yard divided by a driveway, a transit zone may include the entire driveway, or at least a path across the driveway, between two grassy parts of a lawn for the mower 100 to traverse.

The work region 200 may be mapped with a terrain map. For example, the terrain map may be developed during a teaching mode of the mower, or during subsequent mowing operations. Regardless, the terrain map may contain information about the terrain of the work region 200, for example, elevation, grade, identified obstacles (e.g., permanent obstacles), identified stuck areas (e.g., areas the mower has gotten stuck whether due to grade or other traction conditions), or other information that may facilitate the ability of the mower 100 to traverse the work region.

The coordinate system 204 is shown for illustrative purposes only. The resolution of points stored in the terrain map may be sufficient to provide useful elevation and/or grade information about the terrain in the work region 200 (e.g., on the order of feet or decimeters). For example, the resolution of points may correspond to spacing between points being less than or equal the width of the mower 100. In some cases, different functions of path planning may use different levels of resolution. For example, path planning that maps containment or exclusion zones may have the highest resolution (e.g., on the order of centimeters). In other words, the resolution of points proximate to, adjacent to, or near irregular boundaries or obstacles may have a finer granularity.

The mower 100 may start coverage of the work region 200, e.g., starting at a boundary of the work region. The mower 100 may determine a first zone 202. The zone 202 may be located adjacent to a boundary of the work region 200 or, as illustrated, may be located further within the work region. In one embodiment, the zone 202 covers the entire work region 200.

In another embodiment, the zone 202 does not cover the entire work region 200. When the mower 100 is finished mowing the zone 202, the mower may start another zone (e.g., zone 210, which may be dynamic or fixed) to continue mowing.

The mower 100 may determine a starting coordinate 206, or starting point, within the first zone 202. For example, the starting coordinate 206 may be selected from the highest elevational point within the zone 202 or somewhere at the edge of the zone 202. The mower 100 may rotate, if needed, to orient itself toward the starting coordinate 206 from its current position at the boundary of the work region 200. The mower 100 may propel itself toward the starting coordinate 206.

After arriving at the starting coordinate 206, the mower 100 may begin travelling through the zone 202 to cut grass within the zone. As described below, the mower 100 may use randomly-generated destination waypoints within the zone. In addition, or in the alternative, the mower 100 may use a planned pattern with planned waypoints within the zone. Such pattern mowing may use planned waypoint creation to cover the zone.

When the mower 100 arrives at a final destination waypoint 208, the mower is finished cutting grass within the current zone 202. The mower 100 may determine a next zone 210 (which may or may not be immediately adjacent to the zone 202) and a next starting point 212 within the next zone. The mower 100 may orient itself and begin travelling to the next starting point 212. The path 220 from a final destination waypoint 208 in a zone 202 or toward a next starting point 212 in a next zone 210 may be described as a "go to goal" path (e.g., which may traverse a transit zone).

Once the mower 100 arrives at the next starting point 212, the mower 100 may begin travelling through the next zone 210. The process of generating and working travelling containment zones may be repeated a number of times to provide sufficient coverage of the work region 200.

In FIG. 2B, one method 300 of covering a zone 302 is shown as an overhead view illustrating a sequence of paths for taking the mower 100 through at least part of the zone. The path of the mower 100 shown may be applicable, for example, to operation of the mower 100 when a boundary defines a containment zone around zone 302 within the boundary of the work region 200 (FIG. 2A).

In the illustrated embodiment, the mower 100 travels from starting point 304 to destination waypoint 306. After reaching destination waypoint 306, the mower 100 may determine a second destination waypoint 308, rotate X1 degrees, and travel toward the second destination waypoint. This sequence of rotating and travelling may continue to reach third destination waypoint 310, fourth destination waypoint 312, and final destination waypoint 314 (e.g., using rotations X2, X3, and X4, respectively). Although only a few destination waypoints 306, 308, 310, 312, 314 are shown in this illustration, the mower 100 may travel to several more waypoints in order to sufficiently cover the zone 302. In some embodiments, the mower 100 may select the smallest angle available to rotate and orient itself toward the next destination waypoint (e.g., 90 degrees counter-clockwise instead of 270 degrees clockwise).

FIG. 3 shows one example of a work region 251 including a transit zone 252, or transit path, extending across an exclusion zone 254, such as a driveway. The mowing area, or static containment zones 256, of the work region 251 may be located on each side of the driveway, but no mowing area connects these two sides. To train the transit zone 252, the mower 100 may first be placed at the desired starting point (see solid line representation of mower 100 in FIG. 3). The handle assembly 90 (FIG. 1) may be in the manual mode position. The training phase or mode may then be initiated using the mobile device 119 (FIG. 1). Once initiated, the mower 100 may be pushed or driven along the desired transit zone 252. Once the desired path is traversed (see broken line mower 100 in FIG. 3), the operator may end the training session and save the transit zone. During autonomous mower operation, the mower 100 will only cross from one side of the driveway, or exclusion zone 254, to the other using the defined transit zone 252. Multiple transit zones could be trained across any one exclusion zone.

Once all boundaries (including exclusion zones) and transit zones are taught, a map of the work region may be presented to the user on the mobile device 119 so that the operator can confirm that all boundaries (including exclusion zones) and transit zones are properly accounted for. The operator may then confirm that the boundaries and transit zones are properly represented before autonomous mowing operation may begin. In some embodiments, the operator may be able to delete and/or modify boundaries and transit zones using the mobile device during this review.

Transit zones may be used to define how the mower 100 gets from one portion of the work region to another (or to an isolated second work region). For example, transit zones may be configured to direct the mower: to a particular mowing area; across an exclusion zone such as a sidewalk, patio, or driveway that bifurcates the work region; or through a gate of a fenced yard. The mower will generally not enter into an exclusion zone unless a transit zone is trained through the exclusion zone. Moreover, the mower may not typically mow while moving along some of these transit zones.

Not all exclusion zones may include a transit zone. For example, some exclusion zones may be defined around obstacles that the mower 100 cannot traverse. A transit zone may not be defined across such an exclusion zone.

A base station 258 may be provided and positioned in or near the work region 251. The base station 258 may be connected to a source of electrical power, which may be stationary or portable. The base station 258 provides a storage location for the mower when not operating, and further includes self-engaging electrical connections to permit the mower to autonomously return to the base station 258 and recharge its battery 114 (FIG. 1) when needed.

Figure 4:
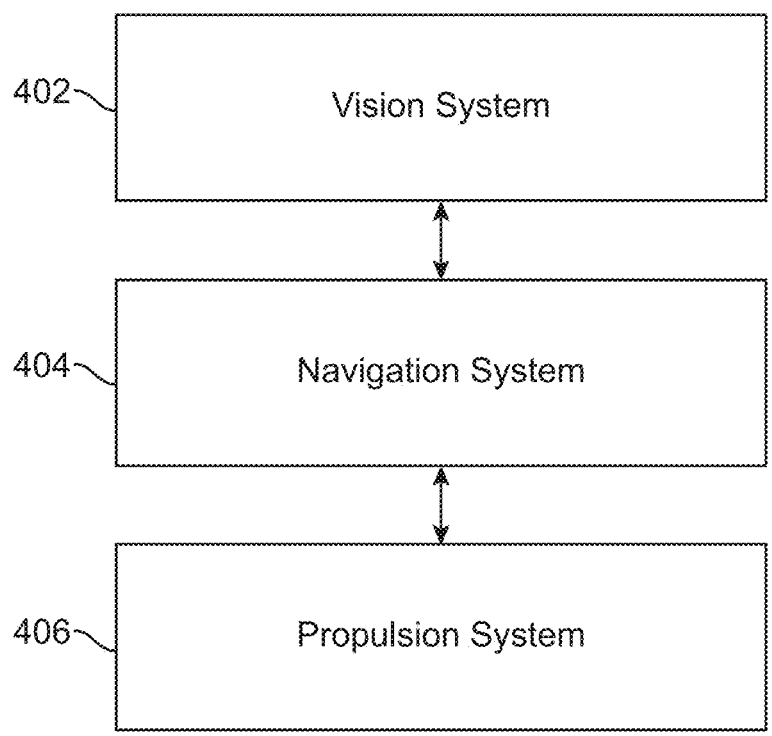
FIG. 4 is a schematic representation of various systems of the machine of FIG. 1 in accordance with one embodiment of the present disclosure.

In FIG. 4, schematic connections between various systems are shown that may be defined by the mower 100 (FIGS. 1-3). A vision system 402 may be operably coupled to a navigation system 404. The navigation system 404 may be operably coupled to the propulsion system 406.

The navigation system 404 may record non-vision-based data during a training mode while the vision system 402 records images, such as training images. Although the mower 100 may be directed manually by a user, in some embodiments, the navigation system 404 may autonomously direct the machine during the training mode. The vision system 402 may include one or more cameras to record, or capture, images. In some embodiments, a controller of the vision system 402 may provide position and/or orientation data to the navigation system 404 based on the recorded images, which may be used to facilitate navigation of the mower 100. For example, the vision system 402 may provide an estimated position and/or orientation of the mower 100 to the navigation system 404 based on vision-based sensor data.

In some embodiments, the navigation system 404 may primarily use a position and/or orientation based on non-vision-based sensor data for navigation. For example, non-vision-based sensor data may be based on an output from an inertial measurement unit or wheel encoder. During a training mode and/or an offline mode, for example, a controller of the navigation system 404 may determine a boundary using non-vision-based sensor data, and the vision-based data, for subsequent navigation of the autonomous machine in the work region. During an online mode, for example, a controller of the navigation system 404 may determine a pose based on vision-based pose data, non-vision-based pose data, or both. In some embodiments, a pose may be determined based on non-vision-based sensor data and update the pose based on the vision-based pose data. The navigation system 404 may compare the vision-based position and/or orientation to the non-vision-based position and/or orientation to correct for errors and update the position, which may be described as sensor fusion. In some embodiments, sensor data other than vision-based sensor data may be used to correct for errors and update the position, such as GPS data.

A controller of the navigation system 404 may command the propulsion system 406 based on an updated pose. For example, a corrected or updated position and/or orientation may be used by the navigation system 404 to provide propulsion commands to a propulsion system 406. The propulsion system 406 (e.g., propulsion hardware) may be defined to include, for example, motors 112, 104 and wheels 106, 108 (FIG. 1) and/or any related drivers (e.g., motor controllers or microchips).

Figure 5:
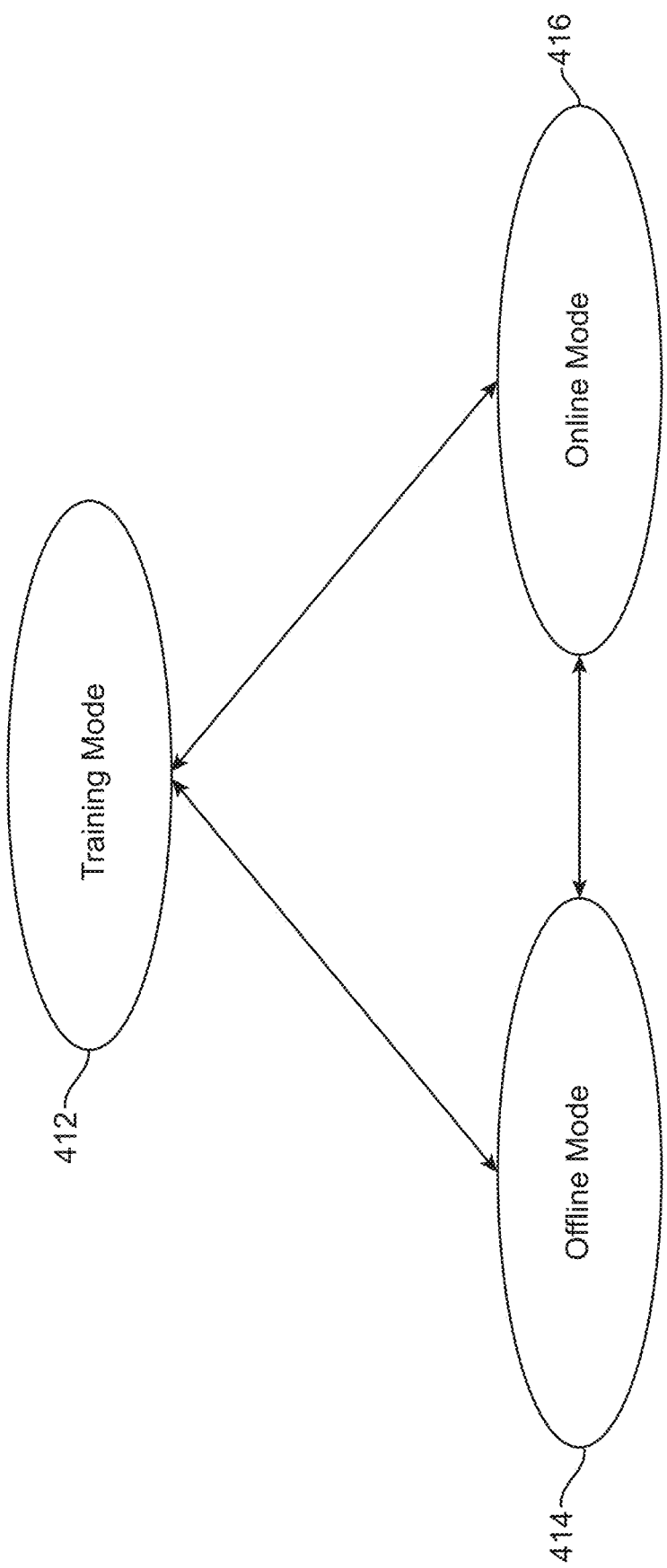
FIG. 5 is a schematic representation of various modes of the machine of FIG. 1 in accordance with one embodiment of the present disclosure.

In FIG. 5, schematic modes or states are shown that may be used by the mower 100 (FIGS. 1-3). As illustrated, the mower 100 may be configured in a training mode 412, an offline mode 414, and an online mode 416. The mower 100 may switch between the various modes, which may also be described as configurations or states. Some functionality of the mower 100 may be used during certain modes, for example, to optimally utilize computing resources.

As used herein, the term "training mode" refers to a routine or state of an autonomous machine (e.g., mower 100) for recording data for later or subsequent navigation of the machine in a work region. During the training mode, the machine may traverse the work region without performing maintenance functions. For example, a training mode of an autonomous lawn mower may include directing the mower to traverse along some or all of the work region (e.g., along a desired boundary path), or a zone within the work region (e.g., containment zone or exclusion zone), and may or may not use a mowing blade in the zone or work region. In some cases, the mower may be manually directed using a handle (e.g., handle assembly 90 of FIG. 1) in the training mode. In other cases, the mower may be autonomously directed by the navigation system.

As used herein, the term "offline mode" refers to a routine or state of an autonomous machine (e.g., mower 100) for charging a portable power supply or processing data recorded during an online mode or training mode. For example, an offline mode of an autonomous lawn mower may include docking the mower in a charging station overnight and processing data recorded during a training mode or an online mode.

As used herein, the term "online mode" refers to a routine or state of an autonomous machine (e.g., mower 100) for operating in a work region, which may include traversing the work region and performing maintenance functions using a maintenance implement. For example, an online mode of an autonomous lawn mower may include directing the mower to cover or traverse the work region, or a zone within the work region, and using a mowing blade in the zone or work region to cut grass.

In general, the mower 100 may interact with the mobile device 119 (FIG. 1) during, for example, the training mode 412 and/or the online mode 416.

In some embodiments, while a user manually directs the mower 100 during the training mode, the mobile device 119 may be used to provide training speed feedback. The feedback may indicate whether the user is moving the autonomous machine too quickly during training using, e.g., a color-coded dashboard.

In some embodiments, the mobile device 119 may be used to inform the user about certain areas, zones, or portions of the work region where the images acquired were not sufficient. For example, an error in a certain area may be detected and the mobile device 119 may inform the user of where the area is and may even direct the user along a path to record additional images to correct the detected error.

In some embodiments, the mobile device 119 may be used to select the type of boundary or zone for training: containment zone, exclusion zone, or transit zone.

In some embodiments, the mobile device 119 may be used to provide real-time zone shape feedback. The zone shape may or may not be tied to a real-world scale and orientation. For example, a map based on sensor data may be used to provide the zone shape feedback to the mobile device 119.

The mower may provide the time-to-completion estimate via an application running on the mobile device, or via periodic notifications (e.g., text messages) provided to the mobile device.

Figure 6:
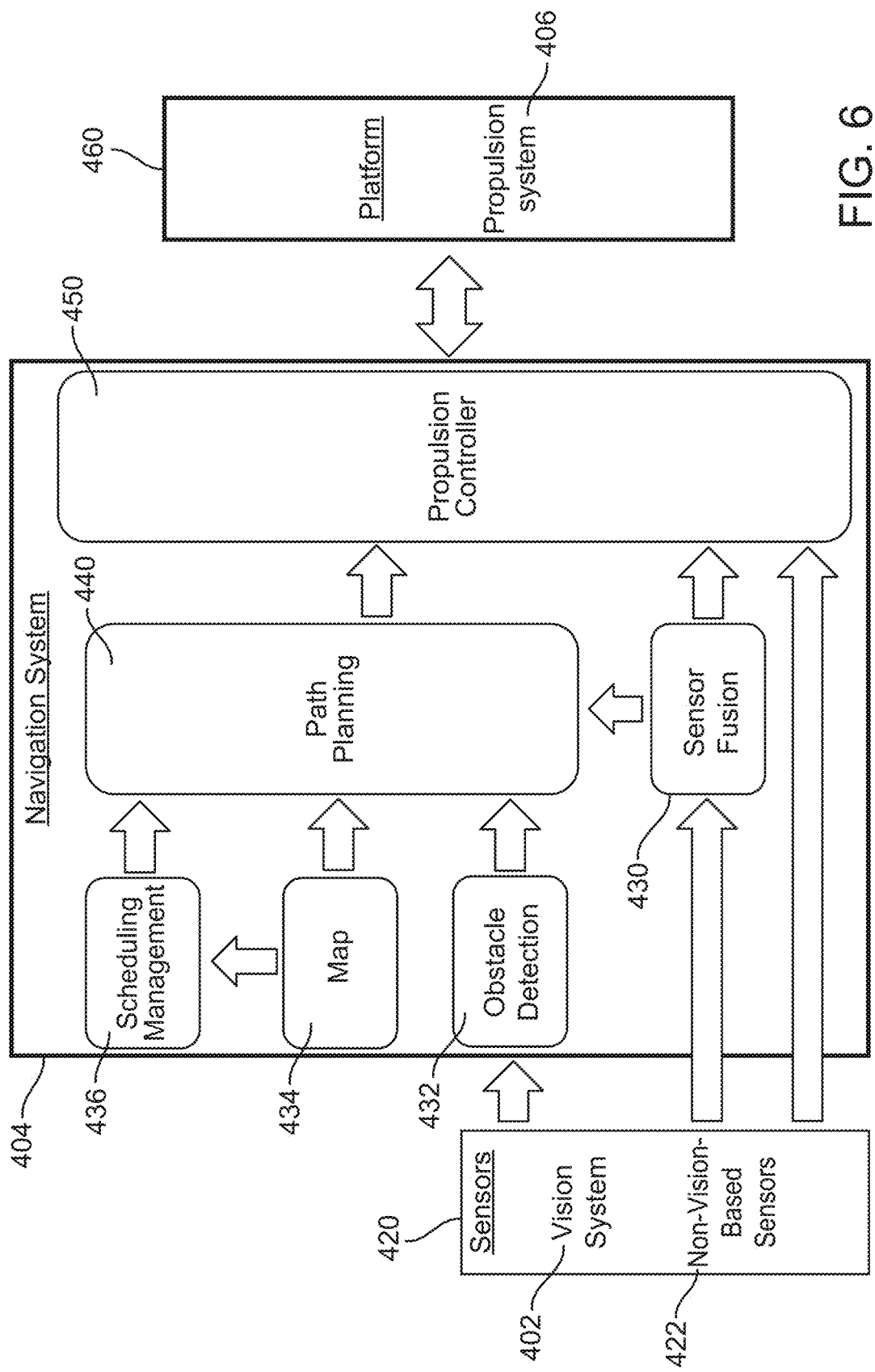
FIG. 6 is a schematic representation of sensors providing data to a navigation system that communicates with a platform of the machine of FIG. 1 in accordance with one embodiment of the present disclosure.

In FIG. 6, schematic representations of various systems of an autonomous machine (e.g., mower 100 of FIGS. 1-3) are shown. Sensors 420 may be operably coupled to the navigation system 404 to provide various sensor data, for example, to be used during an online mode. The vision system 402 (e.g., vision controller) and the navigation system 404 (e.g., navigation controller) may each include its own processor and memory. Various modules of the navigation system 404 are shown to implement various functionality to navigate the autonomous machine. The navigation system 404 may be operably coupled to a platform 460 to control physical actions of the autonomous machine.

The sensors 420 may include sensors associated with the navigation system 404, vision system 402, or both. The navigation system 404 and the vision system 402 may both include the same type of sensors. For example, the systems 402, 404 may each include an inertial measurement unit (IMU).

As used herein, the term "platform" refers to structure of the mower (e.g., mower 100 of FIGS. 1-3) that support the sensors 420 and the navigation system 404. For example, the platform 460 may include a propulsion system 406 (e.g., motors and wheels), the housing 102 (FIG. 1), the cutting motor 112 (FIG. 1), and the maintenance implement 110 (FIG. 1), among other possible components. In some embodiments, the entire autonomous machine may be described as being on the platform 460.

In the illustrated embodiment, the sensors 420 include the vision system 402 and non-vision-based sensors 422. Sensor data from the sensors 420 may be provided to a sensor fusion module 430. In particular, the vision system 402 may provide an estimated vision-based pose containing position and orientation parameters to the sensor fusion module 430. Non-vision-based sensors 422 may include, for example, an IMU and/or a wheel encoder. The sensor fusion module 430 may provide an estimated pose of the autonomous machine based on sensor data from the sensors 420. In particular, the sensor fusion module 430 may estimate a non-vision-based pose based on data from non-vision based sensors 422, which may be corrected or updated using a vision-based pose estimate determined based on data from vision-based sensors of the vision system 402.

As used herein, the term "pose" refers to a position and an orientation. The pose may be a six-degrees of freedom pose (6DOF pose), which may include all position and orientation parameters for a three-dimensional space. Pose data may include a three-dimensional position and a three-dimensional orientation. For example, the position may include at least one position parameter selected from: an x-axis, a y-axis, and a z-axis coordinate (e.g., using a Cartesian coordinate system). Any suitable angular orientation representations may be used. Non-limiting examples of angular orientation representations include a yaw, pitch, and roll representation, a Rodrigues' representation, a quaternions representation, and a direction cosine matrix (DCM) representation may also be used alone or in combination. In one example, the orientation may include at least one orientation parameter selected from a yaw (e.g., vertical z-axis orientation), a pitch (e.g., a transverse y-axis orientation), and a roll (e.g., a longitudinal x-axis orientation).

A path planning module 440 may receive the estimated pose of the autonomous machine from the sensor fusion module 430 and use the estimated pose for autonomous navigation. Other information, or data, may be received by the path planning module 440 to facilitate navigation. An obstacle detection module 432 may provide information regarding the presence of an obstacle in the work region and the position of the obstacle based on sensor data from the sensors 420. The navigation system 404 may also define and update a map 434, or navigation map, of at least the work region. The map 434 may define or be updated to define one or more of containment zones, exclusion zones, transit zones, and mowing history, each of which may be provided to the path planning module 440 to facilitate navigation. Mowing history may also be provided to a scheduling management module 436. The scheduling management module 436 may be used to inform the path planning module 440 of various tasks for the autonomous machine, such as when to start mowing the work region during the week. Also, the path planning module 440 may perform both global path planning (e.g., determining zones within the work region) and local path planning (e.g., determining waypoints or starting points).

A propulsion controller 450 may receive data from the path planning module 440, the sensor fusion module 430, and the sensors 420, which may be used by the propulsion controller 450 to provide propulsion commands to the propulsion system 406. For example, the propulsion controller 450 may determine a speed or traction level based on data from the sensors 420. The path planning module 440 may provide one or more waypoints or starting points to the propulsion controller 450, which may be used to traverse the some or all the work region. The sensor fusion module 430 may be used to provide rate or speed data, accelerations, positions, and orientations of the autonomous machine to the propulsion controller 450. The propulsion controller 450 may also determine whether the autonomous machine is traversing the path determined by the path planning module 440 and may facilitate correcting the path of the machine accordingly.

Other information, or data, related to the maintenance functionality of the autonomous machine may be provided to the propulsion controller 450 to control a maintenance implement, such as a cutting blade for mowing. For example, a motor drive current for the cutting blade motor may be provided to the propulsion controller 450. The propulsion controller 450 may also provide maintenance commands, for example, to control a maintenance implement on the platform 460.

Figure 7:
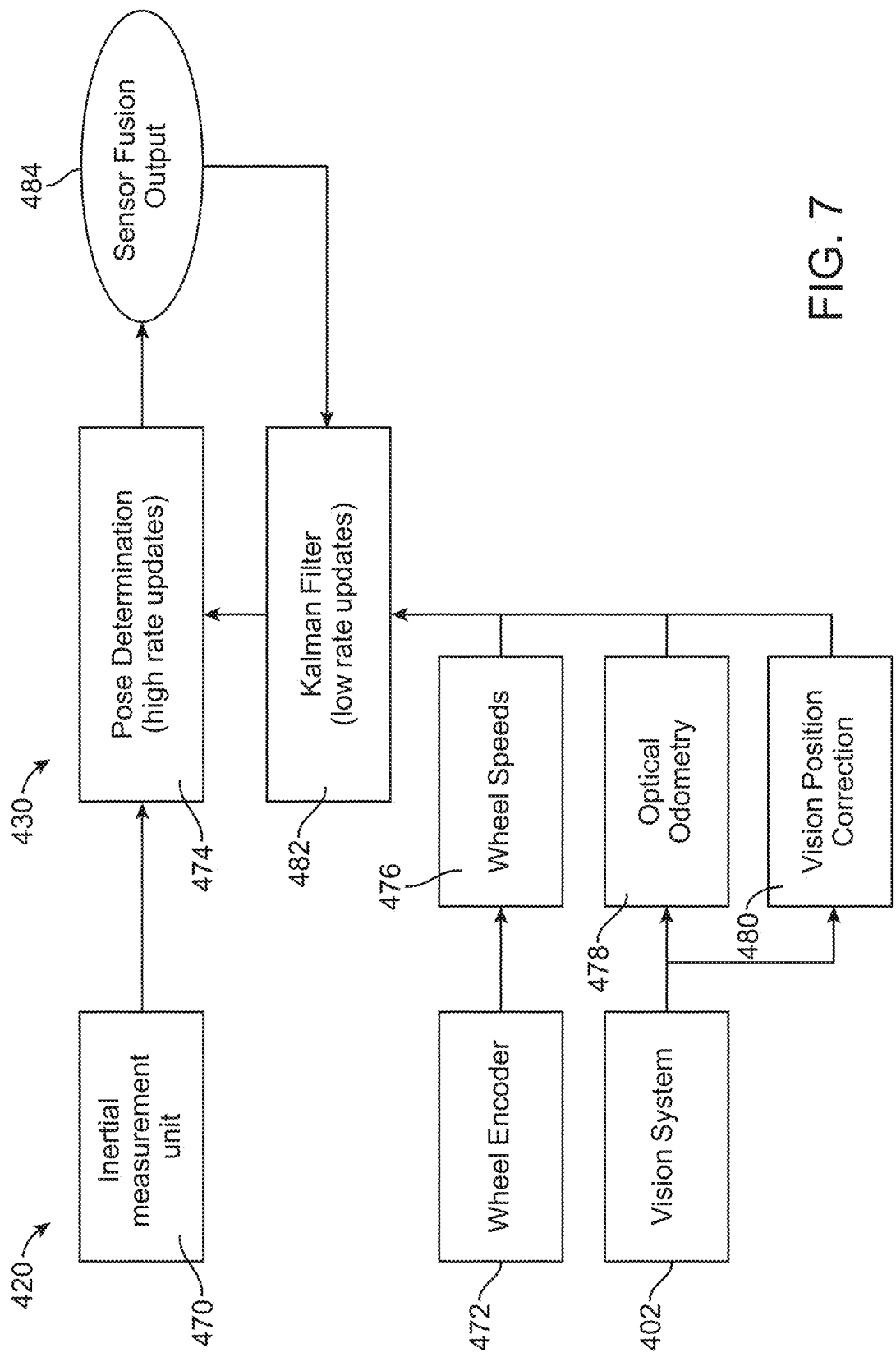
FIG. 7 is as schematic representation of sensor data input and sensor fusion processing in a sensor fusion module for use with the navigation system of FIG. 6 in accordance with one embodiment of the present disclosure.

In FIG. 7, shows one example of implementing the sensor fusion module 430 using sensor data from the sensors 420. Any suitable sensor data from various sensors 420 may be used. As illustrated, the sensors 420 include an inertial measurement unit 470, a wheel encoder 472, and the vision system 402.

Inertial measurement data from the inertial measurement unit 470 may be used by a pose determination module 474. The pose determination module 474 may provide an estimated pose of the autonomous machine based at least in part of the inertial measurement data. In particular, the pose determination module 474 may provide at least one of an estimated position and orientation. In some embodiments, the pose determination module 474 may even provide one or more velocities (e.g., speed or rate).

A Kalman filter 482 may be used to provide pose estimation data to the pose determination module 474, which may also be used to provide an estimated pose of the autonomous machine. In particular, the Kalman filter 482 may provide at least one of an estimated delta position, delta velocity, and delta orientation. As used herein, the term "delta" refers to a change in a variable or parameter. In some embodiments, output data from the Kalman filter 482 may be used to correct errors in a pose estimated based on data from the inertial measurement unit 470. The pose determination module 474 may provide a corrected, or updated, pose in the sensor fusion output 484.

The Kalman filter 482 may receive information, or data, based on output from the wheel encoder 472 and the vision system 402. The wheel encoder 472 may provide wheel speeds 476 to the Kalman filter 482. The vision system 402 may provide optical odometry 478 and vision position correction 480. Optical odometry 478 may utilize images and determine information about movement of the autonomous machine, such as a distance that the autonomous machine has traveled. In general, optical odometry 478 may be used to determine a change in position, a change in orientation, a linear velocity, an angular velocity, or any combination of these. Any suitable optical odometry algorithms available to one of ordinary skill in the art may be used depending on the particular autonomous machine and application. The vision position correction 480 provided by the vision system 402 may include a vision-based pose data, for example, a vision-based pose estimate.

The pose determination module 474 may receive or process data from the Kalman filter 482 at a low refresh rate and use low rate updates. Data from the inertial measurement unit 470 may be received or processed at a high refresh rate and use high rate updates faster than the Kalman filter data. Output from the sensor fusion output 484 may feed back into the Kalman filter 482 as an input to facilitate Kalman filter operation. In other words, the pose determination module 474 may provide an estimated pose at a higher rate than the output of the Kalman filter 482 or the Kalman filter inputs (wheel speeds 476, optical odometry 478, or vision position correction 480). For example, the vision position correction 480 may be performed at various rates on the order of one to four times per minute (e.g., about $\frac{1}{10}$ Hz or $\frac{1}{100}$ Hz), whereas the pose determination module 474 may provide a pose on the order of 6000 times per minute (e.g., about 100 Hz). In some embodiments, the higher rate may be an order of magnitude that is one, two, three, four, five, or even six times the lower rate.

In some embodiments (not shown), the Kalman filter 482 may be included in the pose determination module 474. In some embodiments, the Kalman filter 482 may use a high refresh rate.

Figure 8:
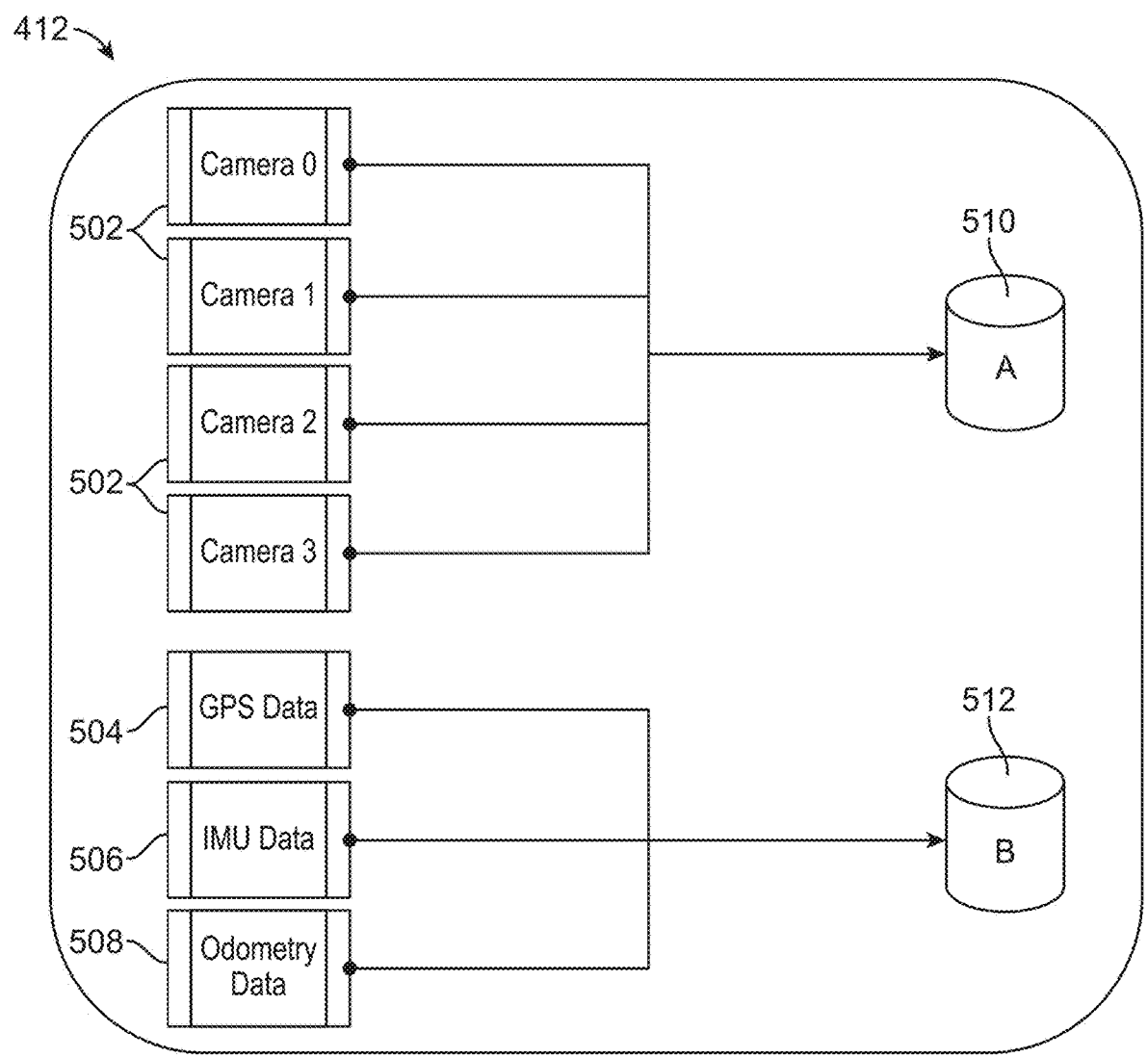
FIG. 8 is a functional schematic of a vision system during the training mode of FIG. 5 in accordance with one embodiment of the present disclosure.

In FIG. 8, schematic representations of various data and data structures that may be used by a vision system (e.g., vision system 402 of FIG. 4) in one example of a training mode 412 for recording data are shown. In general, during training mode, data is recorded while the autonomous machine is directed along a work region, for example, along a desired boundary of the work region). In particular, training images may be recorded while the autonomous machine is directed along the work region.

During training mode, camera data 502 from one or more cameras (e.g., cameras 133 of FIG. 1 that may include a forward-facing, rearward-facing, left-racing, and right-facing camera) may be provided to and stored in a data structure 510 as training images. Although camera data 502 from four cameras are shown, data from any number of cameras may be used. The camera data 502 may include images, which may be described as image data or timestamped image data. The camera data 502 may be described as vision-based data.

Also, during training mode, non-vision-based data may also be recorded. In the illustrated embodiment, the non-vision-based data includes GPS data 504, IMU data 506, and odometry data 508 (e.g., wheel encoder data). The non-vision-based data may be provided to and stored in a data structure 512. The non-vision-based data may include timestamped non-vision-based data. Any combination of non-vision-based data may be used. In some embodiments, non-vision-based data is optional and may not be used by the vision system.

While the vision system records data, the navigation system of the autonomous machine may be utilized to observe and define boundaries for containment, exclusion, and transit zones. The boundaries may be stored in the navigation system for subsequent navigation during an online mode.

Figure 9:
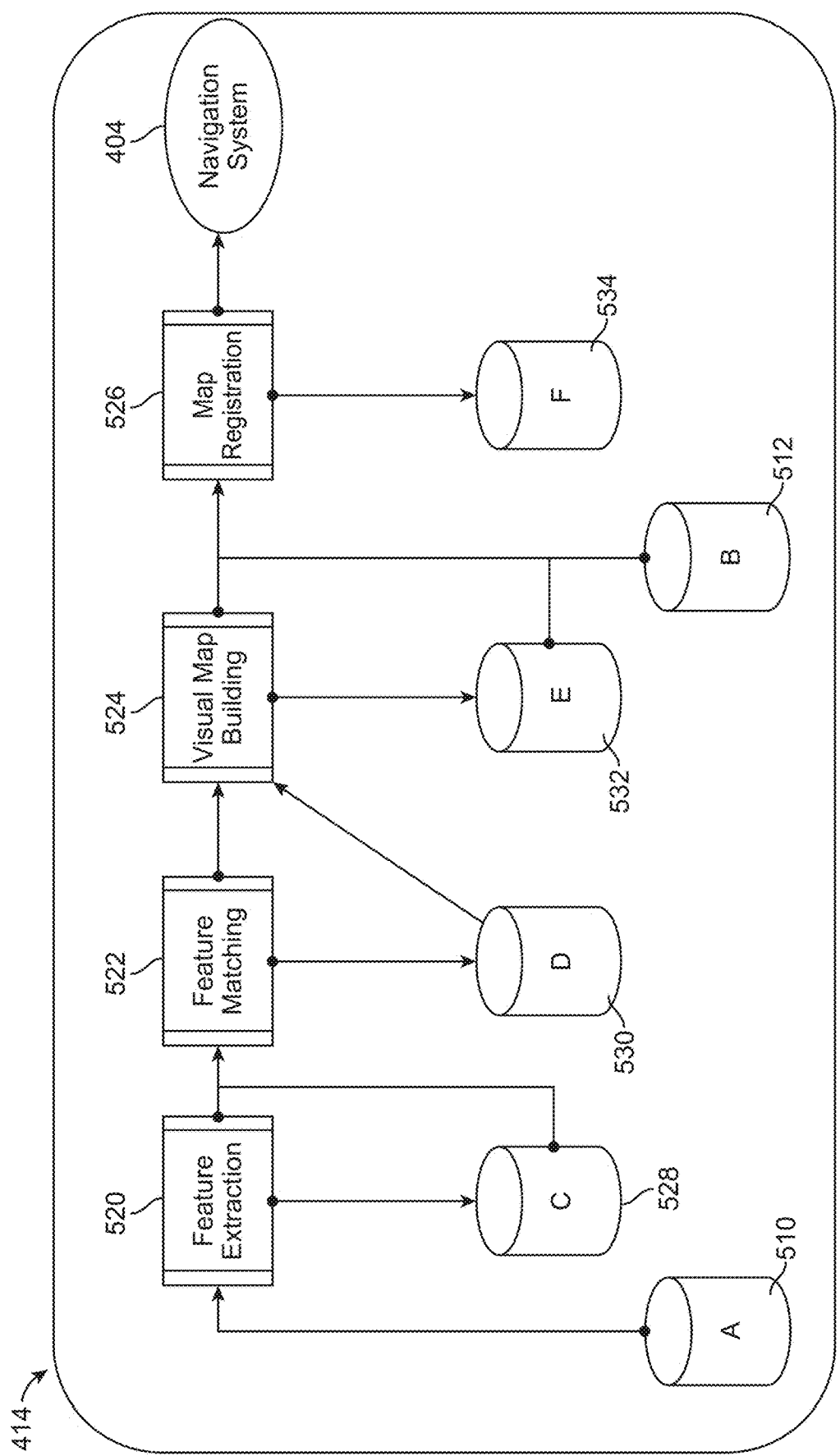
FIG. 9 is a functional schematic of a vision system during the offline mode of FIG. 5 in accordance with one embodiment of the present disclosure.

In FIG. 9, schematic representations of various data, data structures, and modules of the vision system in one example of an offline mode 414 for processing data are shown. The offline mode 414 may be used subsequent to a training mode 412 (FIG. 5). The camera data 502, which may have been stored in data structure 510 as training images during a training mode, may be provided to feature extraction module 520. The feature extraction module 520 may utilize a feature extraction algorithm, a descriptor algorithm, or both to extract feature data that is provided to and stored in a data structure 528 based on results of the feature extraction or description algorithm.

As used herein, the term "feature" refers to two-dimensional (2D) data that results from identifying one or more points, in particular key points or points of interest, in a two-dimensional image. Features may be identified in and extracted from an image using a feature detector algorithm. Any suitable feature detector algorithm available to one having ordinary skill in the art may be used depending on the particular autonomous machine and application. In some embodiments, each unique feature refers to only one point, or point of interest, in an image or 3DPC. The feature may be stored as feature data containing coordinates defined relative to the image frame. In some embodiments, feature data may also include a descriptor applied to, associated with, or corresponding to the feature. The term "feature data" refers to a data structure that represents features and may include a two-dimensional position and a multi-dimensional descriptor (e.g., two-dimensional or three-dimensional).

Key points used to identify features may be extracted from various objects in an image. In some embodiments, the objects may be permanent, temporary, or both. In some embodiments, the objects may be natural, artificial, or both. One example of a permanent feature is a corner of a house. One example of a natural feature is an edge of a tree trunk. Some examples of temporary and artificial features include a stake in the ground and a target on a tree. The artificial feature may be temporarily placed and used to increase feature density within a work region (e.g., to improve a low-quality portion of a 3DPC). The artificial feature may be powered and, for example, may include a light emitter for visible or non-visible light detectable by a camera. The artificial feature may be unpowered and, for example, may include a visible or non-visible pattern detectable by a camera. Some artificial features may be permanently placed. As used herein, the term "non-visible" refers to emitting or reflecting wavelengths of light that are not visible to the human eye, but which may emit or reflect wavelengths visible by a camera, such as an infrared camera on the autonomous machine.

As used herein, the term "descriptor" refers to two-dimensional data that results from a descriptor algorithm. The descriptor describes the feature in the context of the image. In some embodiments, a descriptor may describe pixel values, image gradients, scale-space information, or other data in the image near or around the feature. For example, the descriptor may include an orientation vector for the feature or may include a patch of image. Any suitable descriptor algorithm for providing context for a feature in an image that is available to one having ordinary skill in the art may be used depending on the particular autonomous machine or application. A descriptor may be stored as part of feature data.

Techniques described herein for feature detection, descriptors, feature matching, or visual map building may include or utilize algorithms, such as a Scale Invariant Feature Transform (SIFT), Speeded Up Robust Features (SURF), Oriented FAST and Rotated Brief (ORB), KAZE, Accelerated-KAZE (AKAZE), linear feature tracking, camera merging, loop closure, incremental structure from motion, or other suitable algorithms. Such algorithms may, for example, provide one or more features and descriptors to the feature matching module 522 and visual map building module 524 described below.

The output of the feature extraction module 520 and/or the feature data stored in a data structure 528 may be provided to feature matching module 522. The feature matching module 522 may utilize a feature matching algorithm to match features identified in different training images. Different images may have different lighting around the same physical key points, which may lead to some differences in the descriptors for the same features. Features having a similarity above a threshold may be determined to be the same feature.

Any suitable feature matching algorithm available to one of ordinary skill in the art may be used depending on the particular autonomous machine and application. Non-limiting examples of suitable algorithms include Brute-Force, Approximate Nearest Neighbor (ANN), and Fast Library for Approximate Nearest Neighbor (FLANN). The Brute-Force algorithm may match features by selecting one feature and checking all other features for a match. The feature matching module 522 may provide and store matching data in a data structure 530 based on the results of the feature matching algorithm.

The output of the feature matching module 522 and/or the matching data stored in the data structure 530 may be provided to a visual map building module 524. The visual map building module 524 may utilize a map building technique, such as the method shown in FIG. 15, to create a 3DPC. In general, the techniques described herein that generate a 3DPC using vision-based sensors may be described as a Structure from Motion (SfM) technique or Simultaneous Localization and Mapping (SLAM) technique, either of which may be used with various embodiments of the present disclosure, for example, depending on the particular autonomous machine and application.

As used herein, the term "three-dimensional point cloud," "3D point cloud," or "3DPC" is a data structure that represents or contains three-dimensional geometric points which correspond to features extracted from images. The 3DPC may be associated with various properties, such as poses. In some embodiments, the geometric points and poses may or may not be defined in a coordinate system based on an arbitrary frame of reference. In some embodiments, the 3DPC may or may not be associated with a scale, orientation, or both that is tied to the real-world, for example, until a map registration process has been performed. The 3DPC may be generated based on feature matching data. A graph, or visual map, may be generated based on the 3DPC to provide a human-viewable representation of the 3DPC.

In some embodiments, visual map building module 524 may establish correspondences between 3D points and 2D features, even if the 2D-to-2D correspondences from the feature matching module 522 have not been established. In other words, the visual map building module 524 may not require that all features be matched before beginning the visual map building process.

Other data may be associated with the points of the 3DPC. Non-limiting examples of data that may be associated with each point in the 3DPC includes: one or more images, one or more descriptors, one or more poses, position uncertainty, and pose uncertainty for one or more poses. The 3DPC and associated data may be provided to and stored in a data structure 532.

In some embodiments, associated data may include one or more poses determined and associated with points in the 3DPC as pose data, which may describe the position and/or orientation of the platform or some other component of the system at the times when the features associated with the 3DPC were observed. For example, positions and orientations of the autonomous machine during image recording may be determined based on the positions of various points in the 3DPC and positions of the corresponding features in the recorded images. Positions and orientations, or poses, may also be determined directly during generation of the point cloud. The position, orientation, or both types of data represented in the poses may be used for boundary determination or pose correction by the navigation system.

The output of the visual map building module 524 and/or the 3DPC and associated data stored in the data structure 532, which may include a plurality of 6DOF poses, the 3DPC, and a plurality of boundary points in a visual map or navigation map, may be provided to a map registration module 526. Optionally, the non-vision-based data, such as GPS data, IMU data, and odometry data, from the data structure 512 may also be provided to the map registration module 526. The map registration module 526 may determine and provide pose data based on a registered map, which may be provided to and used by the navigation system 404. In some embodiments, pose data is provided from the map registration module 526 to the navigation system 404. The pose data may be estimated vision-based pose data. The registered map may also be provided to and stored in a data structure 534.

As used herein, the term "registered map" refers to a 3DPC that has been tied to a real-world scale, real-world orientation, or both. In some embodiments, a registered map may be tied to a real-world map or frame of reference. For example, a GPS may be used to tie the 3DPC to a real-world mapping service, such as GOOGLE MAPS. In some embodiments, when using techniques described herein, the 3DPC may generally be scaled from about 0.5 times up to about 2 times when registered to a real-world map or frame of reference. However, scaling is generally not limited to these ranges.

As used herein, the term "real-world" refers to the Earth or other existing frames of reference for a work region. A non-real-world frame of reference may be described as an arbitrary frame of reference.

Figure 10:
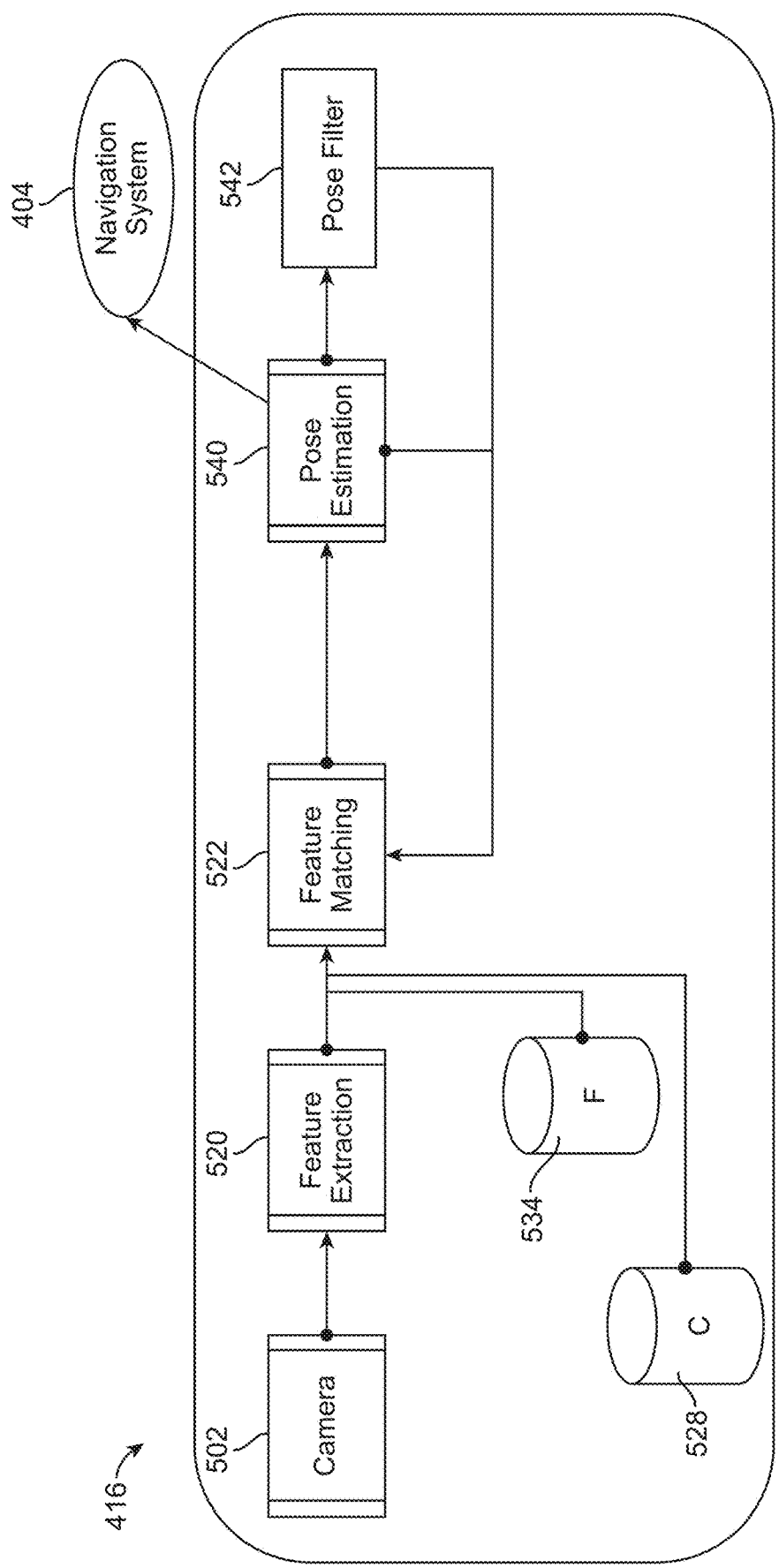
FIG. 10 is a functional schematic of a vision system during the online mode of FIG. 5 in accordance with one embodiment of the present disclosure.

In FIG. 10, schematic representations of various data, data structures, and modules of the vision system in one example of an online mode 416 for pose estimation are shown. The online mode 416 may be used subsequent to a training mode 412, subsequent to an offline mode 414, or both. Instead of capturing images for training, image data in the camera data 502 may be used during operation. Such image data may be described as operational image data including operational images.

The operational images in the camera data 502 may be provided to the feature extraction module 520. The same or different algorithms to extract feature data from training images used during the offline mode 414 may be used on operational images in the online mode 416.

The feature data from the feature extraction module 520 may be provided to the feature matching module 522. The feature matching module 522 may use the same or different algorithms used during the offline mode 414 to match feature data from feature extraction module 520 with features in registered map data from the data structure 534. In some embodiments, feature data from the data structure 528 may also be used as an input to the feature matching module 522. The feature matching module 522 may match features using 2D correspondences, 3D correspondences, correspondences between 2D image positions and 2D projections of 3D data, descriptor values, or any combination of these. The matching data from the feature matching module 522, which may include 2D or 3D correspondences, may be provided to a pose estimation module 540.

The pose estimation module 540 may provide an estimated pose, such as a 6DOF pose, and may be described as vision-based pose. Vision-based pose data from the pose estimation module 540 may be provided to the navigation system 404, a pose filter 542, back to feature matching module 522, or any combination of these.

The pose data may be used by the feature matching module 522 to identify which features are likely to be seen in the camera data 502 based on the estimated pose of the autonomous machine and the locations at which these features are likely to be seen. This information may be used as an input into one or more algorithms of the feature matching module 522.

The pose filter 542 may use pose data to identify which poses are likely, for example, based on prior pose estimates. The filtered pose data from the pose filter 542 may be provided back to the feature matching module 522 to identify which features are likely to be seen in the camera data 502 based on the filtered pose data and the locations at which these features are likely to be seen. This information may be used as an input into one or more algorithms of the feature matching module 522.

In some embodiments, the pose filter 542 may use information from an IMU, wheel encoder, or optical encoder (e.g., sensors 420 of FIGS. 6-7) to filter poses. In some embodiments, the pose filter 542 may be described as using a pose based on non-vision-based sensors, such as an inertial-based navigation system (or INS) including an inertial measurement unit, to inform which poses may be filtered. The navigation system 404 of FIG. 6 may use an independent pose filter, for example, in the sensor fusion module 430. The resulting output, or pose data, from the different pose filters may be compared for correction of, or as a redundancy check on, either output.

In addition, the feature matching module 522 may use feature data, which may include features and/or descriptors, from the data structure 528 to filter out feature data from the feature extraction module 520 that are not similar to any features already extracted during a training mode.

Figure 11:
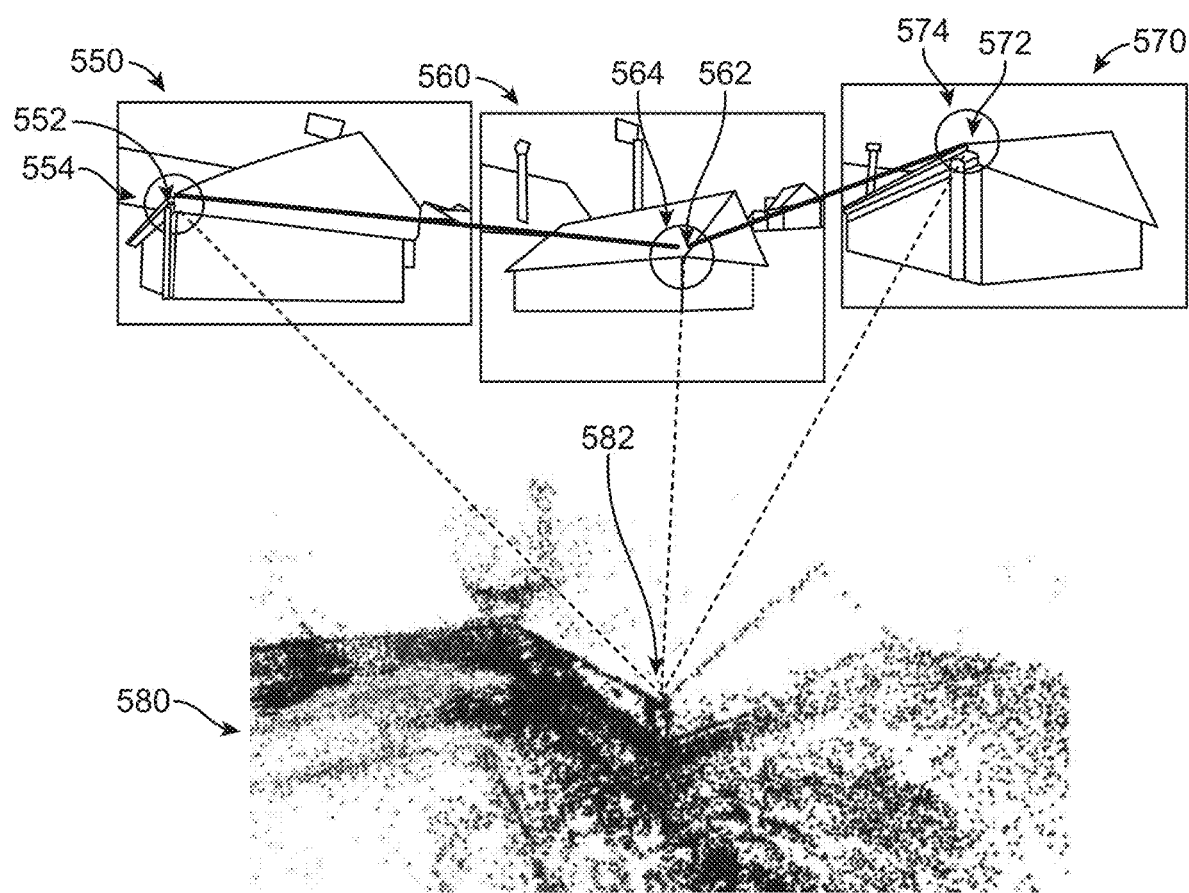
FIG. 11 is a diagrammatic illustration of using training images to generate a three-dimensional point cloud for use during the offline mode of FIG. 5 in accordance with one embodiment of the present disclosure.

In FIG. 11, a series of timestamped images 550, 560, 570 and a 3DPC 580 are shown to illustrate one example of visual map building. A key point may be identified as a two-dimensional feature 552, 562, 572 in the respective image 550, 560, 570, for example, using a feature detector algorithm.

Each feature 552, 562, 572 is extracted and a descriptor algorithm may be applied to generate a multi-dimensional descriptor 554, 564, 574 associated with the respective feature 552, 562, 572. The descriptors 554, 564, 574 are illustrated as circles around the respective feature 552, 562, 572. The features 552, 562, 572 and the descriptors 554, 564, 574 may be included in feature data.

During feature matching, a feature matching algorithm may be used to determine that the features 552, 562, 572 are sufficiently similar based on the descriptors 554, 564, 574. The features may be matched in matching data.

During visual map building, a map building technique may be applied to the feature data and the matching data to identify a three-dimensional point 582 in a 3DPC 580 that corresponds to the features 552, 562, 572. Each point of the 3DPC 580 may be determined in a similar manner.

Figure 12:
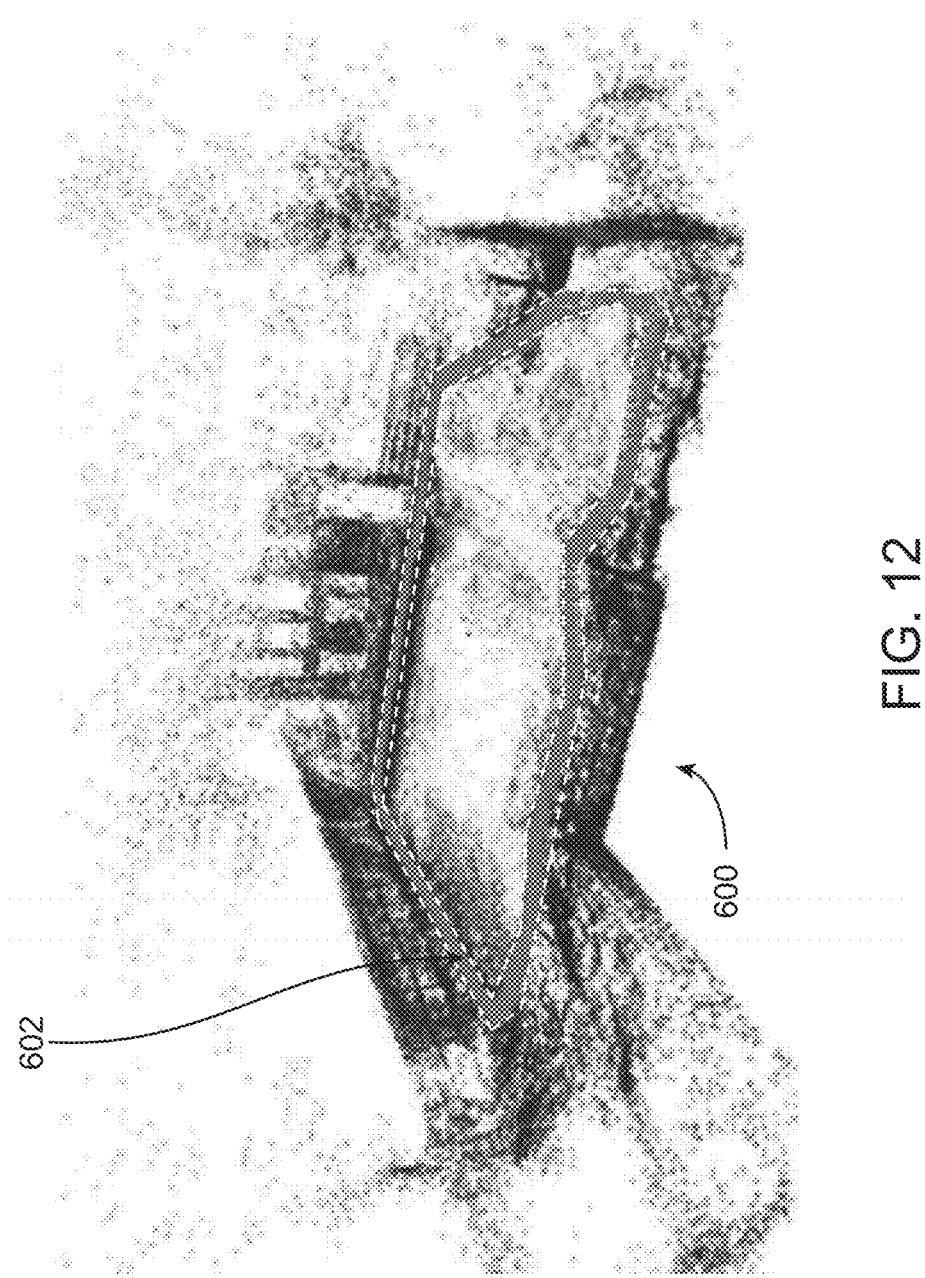
FIG. 12 is a diagrammatic illustration of pose estimates associated with a three-dimensional point cloud generated using the visual map building module of FIG. 9 in accordance with one embodiment of the present disclosure.

In FIG. 12, a 3DPC 600 is shown with pose points 602. In the illustration, the pose points are drawn as red dots that appear to form a path, which is roughly outlined using a white dashed line for visibility. The path may be described as a path around a perimeter of the work region. Points corresponding to feature positions are drawn as black dots. During visual map building, pose points 602 may be determined along with the points corresponding to feature positions. Each pose point 602 corresponds to an estimated pose of the camera used to record one image. Each pose point 602 may be included in pose data provided to the navigation system, which may be used in boundary determination or pose correction.

The boundary may be defined using a line or curve fit of the pose points 602. The boundary may also be defined relative to the line fit, curve fit, or the pose points 602. For example, the boundary may be defined one foot outside of the line fit, curve fit, or the pose points 602.

The quality of the 3DPC 600 may be evaluated. A quality level, or parameter, may also be assigned to various portions of the 3DPC 600. The quality level used to evaluate the 3DPC may be based on various parameters, such as at least one of: a number of poses reconstructed, a number of points reconstructed, reprojection error, point triangulation uncertainty, and reconstructed pose uncertainty.

Figure 13:
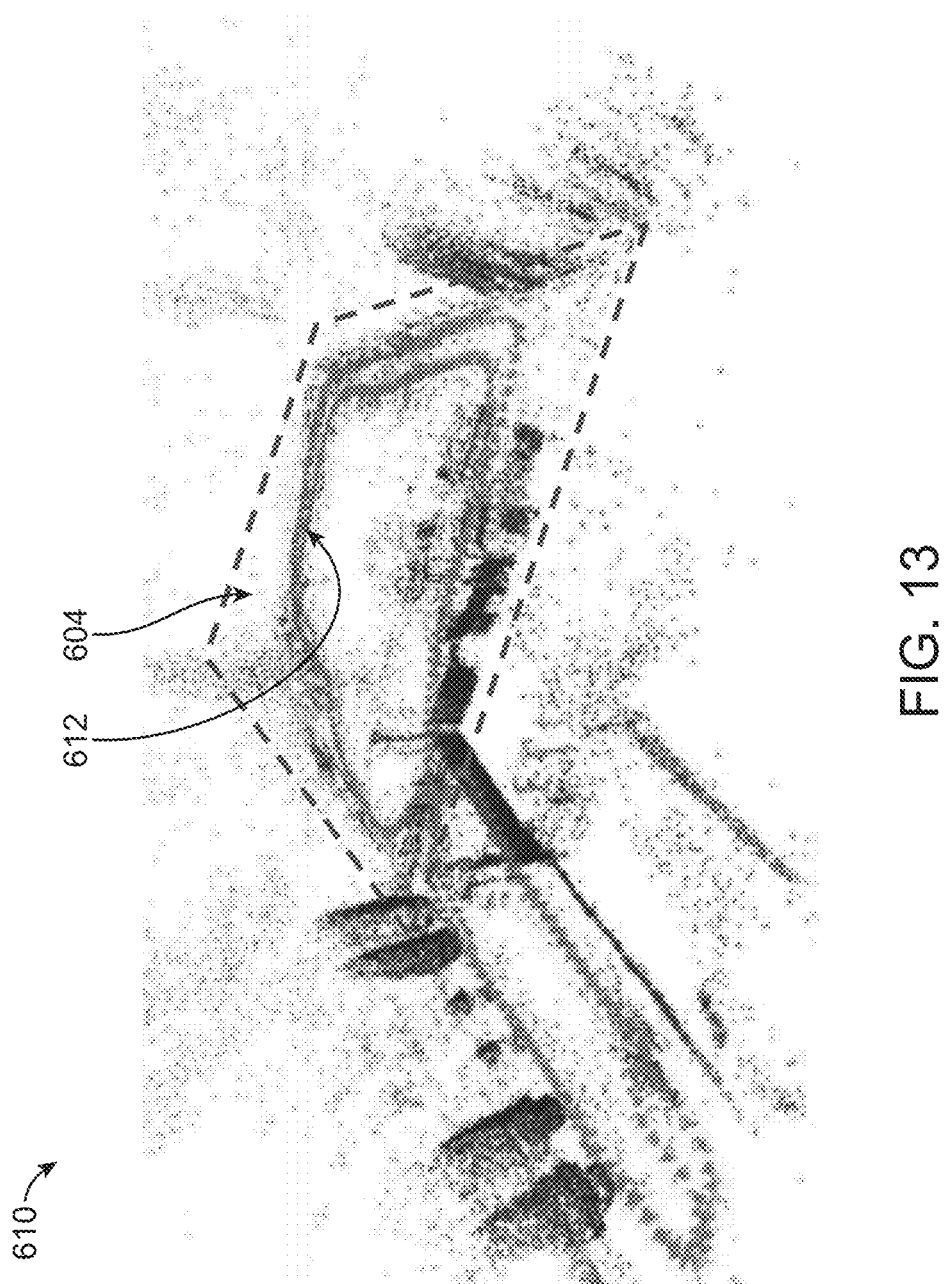
FIG. 13 is a diagrammatic illustration of pose estimates associated with a low-quality portion of a three-dimensional point cloud for a particular work region in accordance with one embodiment of the present disclosure.

In FIG. 13, a 3DPC 610 is shown with pose points 612 and a low-quality portion 604 of the 3DPC. An autonomous machine may be directed along the path represented by the pose points 612. The path may be described as a path around a perimeter of the work region. One or more portions 604 of the 3DPC 600 may be identified as, or determined to be, a low-quality portion 604. For example, a portion of the 3DPC may be determined to have a quality level below a quality threshold. The quality level may be based on, for example, uncertainty values associated with points, uncertainty in the poses corresponding to those points, or a low density of points. For example, as the autonomous machine is directed along a path during training mode, certain areas of the work region may have very few key points visible to the one or more cameras for identifying features (e.g., being near an open field) or the path may be so close to an obstacle such that key points just above or behind the obstacle are not visible from the path (e.g., being near a fence that obstructs the view of a tree beyond or above the fence due to a limited vertical field of view).

It may be desirable to improve the quality level of this portion of the 3DPC. Coordinates or points associated with the low-quality portion may be provided to the navigation system. The navigation system may direct the autonomous machine to traverse the work region to record additional training images, for example, along a different, or secondary, path than the original desired boundary path that is likely to record additional images of key points that may be in the low-quality portion. The navigation system may direct the autonomous machine along the secondary path, for example, during a training mode or online mode. In other words, the autonomous machine may be directed to record images in an area of the work region associated with the low-quality portion of the 3DPC, which may be used to improve the quality of, or "fill in," this portion of the 3DPC.

Figure 14:
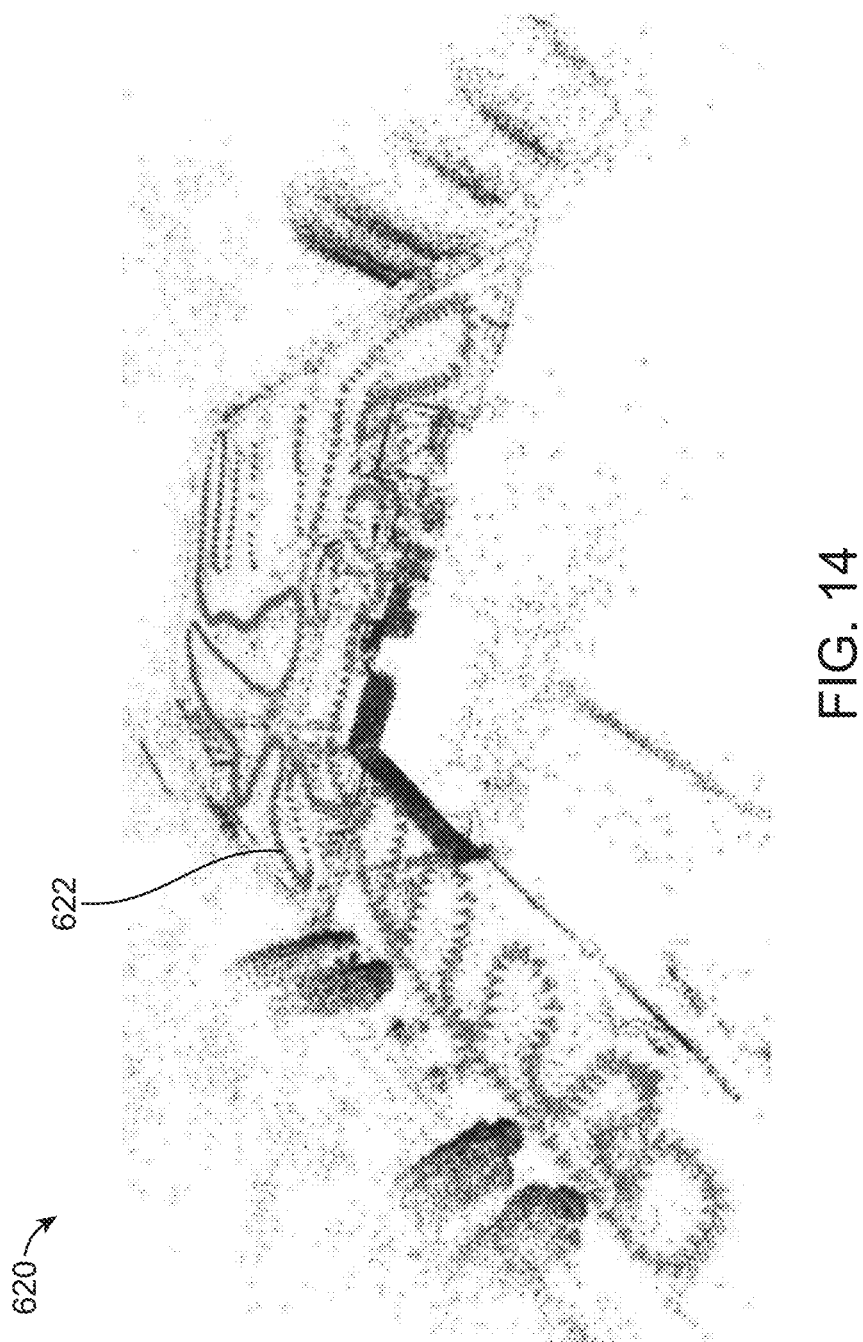
FIG. 14 is a diagrammatic illustration of pose estimated associated with an updated three-dimensional point cloud for the work region of FIG. 13 in accordance with one embodiment of the present disclosure.

In FIG. 14, a 3DPC 620 is shown that represents the same work region as 3DPC 610 (FIG. 13). However, the autonomous machine was directed along a path represented by pose points 622 to record images for generating the 3DPC 620. As illustrated, the 3DPC 622 does not include a low-quality portion. The path may be described as a secondary path. The secondary path may be defined within a boundary, or original path, represented by pose points 612 (FIG. 13). The secondary path pay may be described as traversing along an interior of the work region. The secondary path may include more turns, or "zig-zag" paths, through the work region to capture more points of view from the one or more cameras on the autonomous machine. Any type of changes may be made to the path, such as random, semi-random, or planned path changes, to determine the secondary path. When a secondary path represented by pose points 622 is used for filling in the 3DPC 620, the original path represented by pose points 612 may still be used as the boundary that defines the work region.

In some embodiments, GPS data, such as GPS-RTK data, may be used to help navigate the autonomous machine through areas of the work region associated with low-quality portions of the 3DPC. For GPS data may be provided to a sensor fusion module as one of the non-vision-based sensors. In one example, the autonomous machine may rely more on GPS data when the autonomous machine is traversing an area associated with low-quality portions of the 3DPC. When relying more on GPS data, the GPS data may be "weighted" more heavily than vision-based data. The GPS data may be used for pose correction or even as a primary non-vision-based sensor input to sensor fusion. The autonomous machine may "weight" vision-based data more heavily than GPS data, for example, when the autonomous machine is traversing an area of the work region that contains one or more obstacles that may hinder the GPS receiver 116 (FIG. 1) from receiving appropriately timed signals from GPS satellites. The autonomous machine may also "weight" vision-based data more heavily, for example, when the autonomous machine is traversing an area of the work region that is not associated with low-quality portion of the 3DPC.

Figure 15:
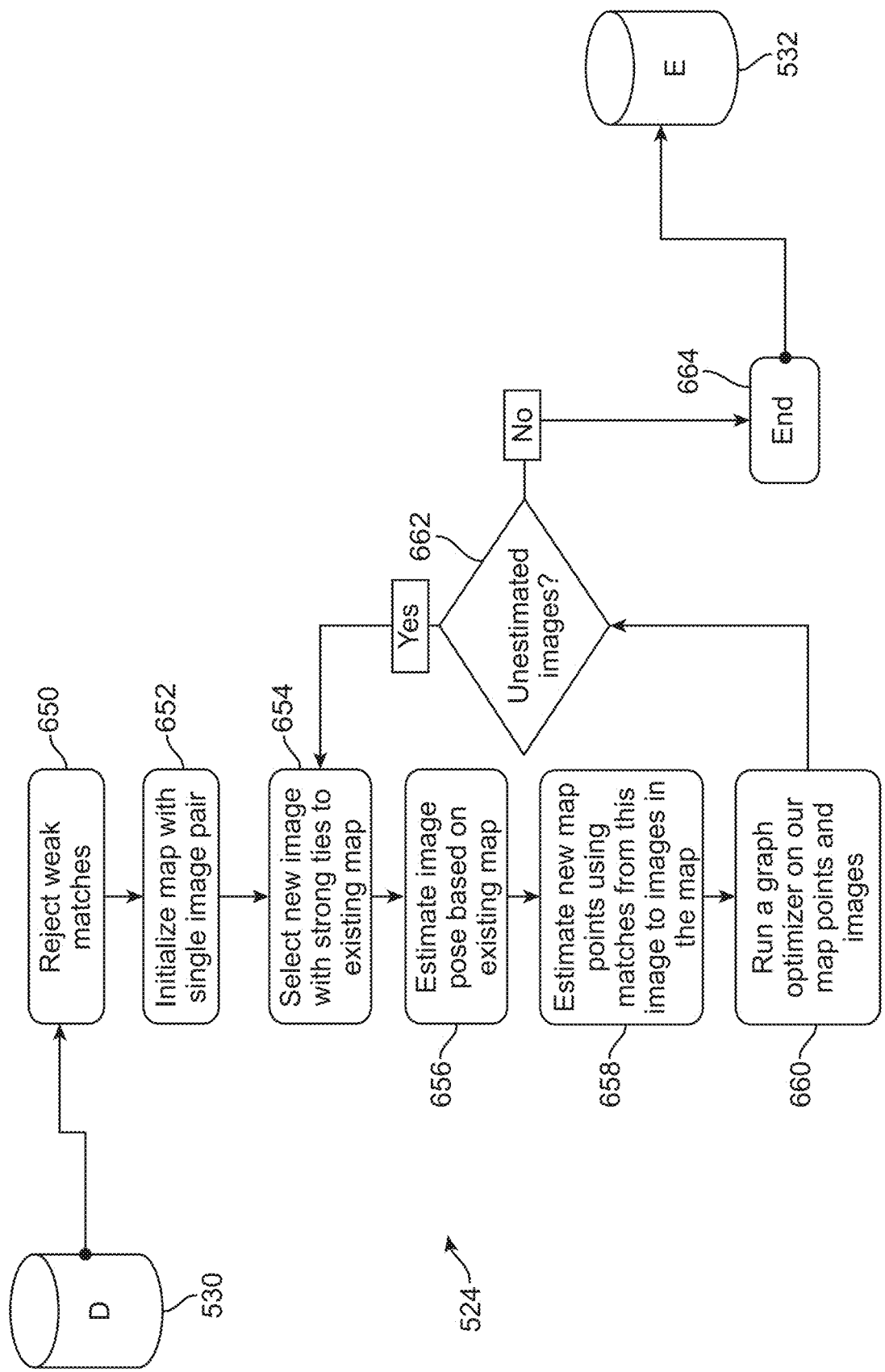
FIG. 15 is a schematic representation of a visual map building method for use during the visual map building module of FIG. 9 in accordance with one embodiment of the present disclosure.

In FIG. 15, a flowchart of one example of a visual map building method used by the visual map building module 524 is shown. At the end 664 of visual map building, a 3DPC may be stored in the data structure 532. In general, the visual map building method may employ removing extraneous points that may confuse various map building algorithms. For example, weak matches or points associated with high uncertainty values may be removed from data before certain map building algorithms are used to generate the 3DPC. A plurality of 6DOF poses and a plurality of boundary points determined based on the plurality of 6DOF poses may be stored in the data structure 532.

Weak matches may be rejected from matching data from the data structure at 650. In particular, matches below a matching threshold in the matching data may be rejected and not used to generate the 3DPC. A weak match may be defined as two features having similar descriptors, such that they are matched using a matching algorithm. However, the features may be in different locations in the work region. Any suitable algorithm available to one with ordinary skill in the art may be used to filter out such weak matches. Some algorithms provide relative or scaled feedback. For example, the result of a ratio test may represent the probability of a good match. A threshold may be used to determine whether the result of the ratio test does not meet or exceeds such a matching threshold. One or more of these tests may be used to determine whether a match is weak. In some embodiments, a weak match may be determined by layering tests and determining whether an overall probability does not meet or exceeds a matching threshold.

A partial 3DPC may be initialized using data based on first and second training images at 652 (e.g., any pair of images). In particular, the partial 3DPC may be initialized using feature data corresponding to a first and a second training image. The feature data may include features and descriptors. The training images may be selected to be sufficiently spaced apart in the work region in distance or time, which may be considered a surrogate for distance as the autonomous machine traverses the work region. The training images may also be selected so that a sufficient number of features are visible in both images. In some embodiments, the first two training images are selected so that one, two, three, or more features are shared between the training images such that the number of shared features exceeds a threshold number of features, and also, the training images are not immediately subsequent recorded images such that the training images are spaced in distance, time, or number of images away by some threshold number (e.g., one, two, three, or more images were recorded in-between).

A third training image with overlapping correspondence to the partial 3DPC is selected at 654. In particular, a third training image may be selected with overlapping correspondence with the partial 3DPC.

The third training image may be selected to corroborate the points identified in the existing partial 3DPC based on the first two images. The overlapping correspondence may be evaluated to determine whether the third training image has a strong tie to the existing partial 3DPC. In other words, the third training image may be selected so that some number exceeding a threshold number of features are shared among the images and that the third training image is spaced some distance, time, or number of images away from the first and second training images by some threshold number.

In general, if three images each have one or more points in common (e.g., a sufficient number of points in common), then the points may be matched within a three-dimensional space. Also, in general, a camera pose may be determined under these same conditions. A pose of the camera used to take the third image may be estimated based on the partial 3DPC at 656.

A new partial 3DPC may be determined based on feature data of the third training image and the partial 3DPC 658. In particular, positions of any new features relative to the partial 3DPC may be estimated using matching data associated with the third training image and matching data associated with the first and second training images.

A graph optimizer may be used on the partial 3DPC and used training images at 660. In particular, the partial 3DPC may be updated using a graph optimizer to refine the estimated positions of features or subset of features, to refine the recovered camera poses or a subset of camera poses, or to refine both feature positions and poses.

A graph optimizer may also be described as bundle adjustment, which is typically referred to as a specific application of graph optimization. The graph optimizer may be based on a mathematical data science technique, similar to least squares regression, but applied to a more connected data structure. The map points may define a graph such that points in the 3DPC are connected to a two-dimensional image space. The connections between 3D and 2D points form graph edges. The optimization problem may assume that some of the information is imperfect and may assume that the most likely location of the graph nodes (e.g., point coordinates for the 3DPC and the vision-based poses) can be determined or estimated based on all the available information. In other words, the graph optimizer recognizes that the generated 3DPC may be "noisy" and finds a "best fit" 3DPC based on all the available information.

If there are additional unused training images available at 662, an additional unused training image with overlapping correspondence with the partial 3DPC may be selected at 654. Poses and positions for each of the additional training images may continue to be estimated at 656, 658. A graph optimizer may continue to be run on the estimated positions of features and unused training images at 660.

If no unused training images are available at 662, the partial 3DPC may represent a full 3DPC. The visual map building method may end at 664 and store the 3DPC and pose data in the data structure 532.

Figure 16:
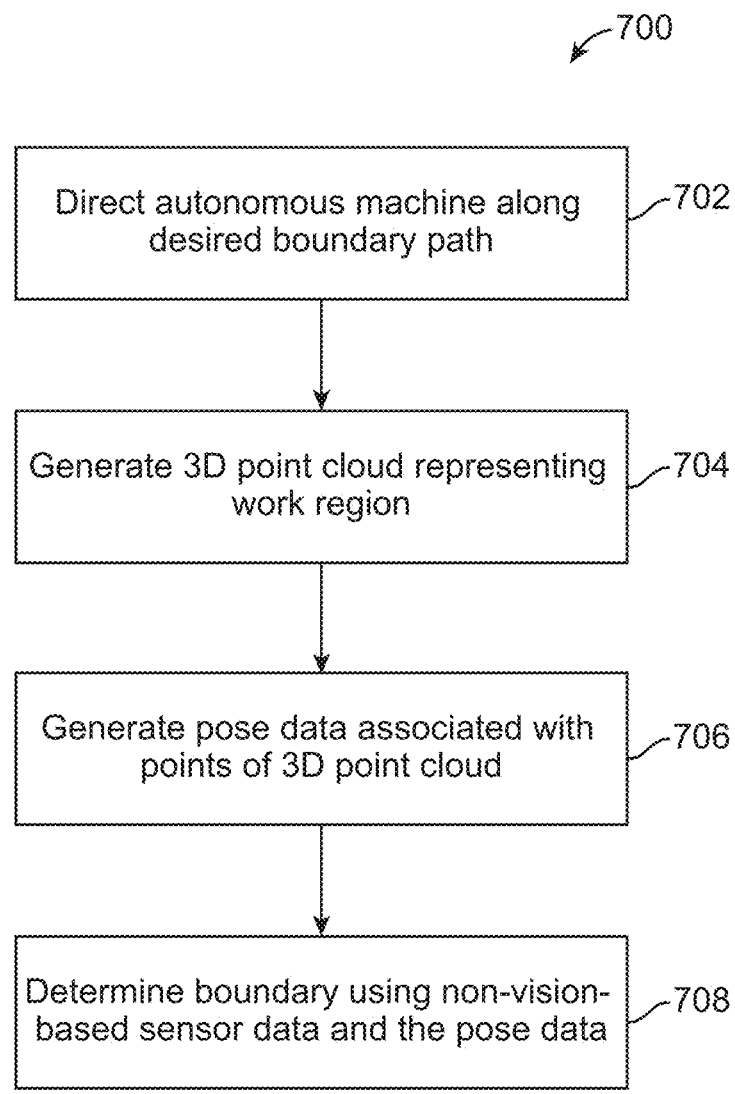
FIG. 16 is a flow diagram of a training method for training the machine of FIG. 1 in accordance with one embodiment of the present disclosure.

In FIG. 16, a schematic representation of an autonomous machine navigation method 700 for training is shown. In a training mode, the autonomous machine may be directed along a work region, for example, along a desired boundary path of the work region at 702. While the autonomous machine is directed in training mode, training images may be captured by a vision system on the autonomous machine. The autonomous machine may be directed manually or automatically along the desired boundary path. The machine may also be directed along a path offset from the desired boundary path, for example, by a predefined distance.

In an offline mode, a 3DPC may be generated that represents the work region and/or an area beyond or surrounding the work region at 704. For example, the 3DPC may also include points outside of the boundary of the work region or even outside of the work region (e.g., when the boundary is defined within the work region). The 3DPC may be generated based on feature data containing two-dimensional features extracted from training images. The 3DPC may also be generated based on matching data relating features in the feature data from different training images.

Pose data may be generated and associated with points of the 3DPC that represents poses of the autonomous machine at 706. The pose data may be described as vision-based pose data. The pose data may include both position and orientation representing the position of the camera or autonomous machine during training mode. In some embodiments, the pose data includes at least a three-dimensional position representing a pose of the autonomous machine during a training mode. The pose of a forward-facing camera may be used to estimate the position of the autonomous machine.

A navigation system of the autonomous machine may be used to determine a boundary using non-vision-based sensor data and the pose data associated with the 3DPC at 708. The boundary may be used for subsequent navigation of the autonomous machine in the work region, for example, during an online mode. Non-vision-based sensor data may be obtained, for example, from an inertial measurement unit. The vision-based pose data associated with the 3DPC may be used to estimate or correct the boundary.

Figure 17:
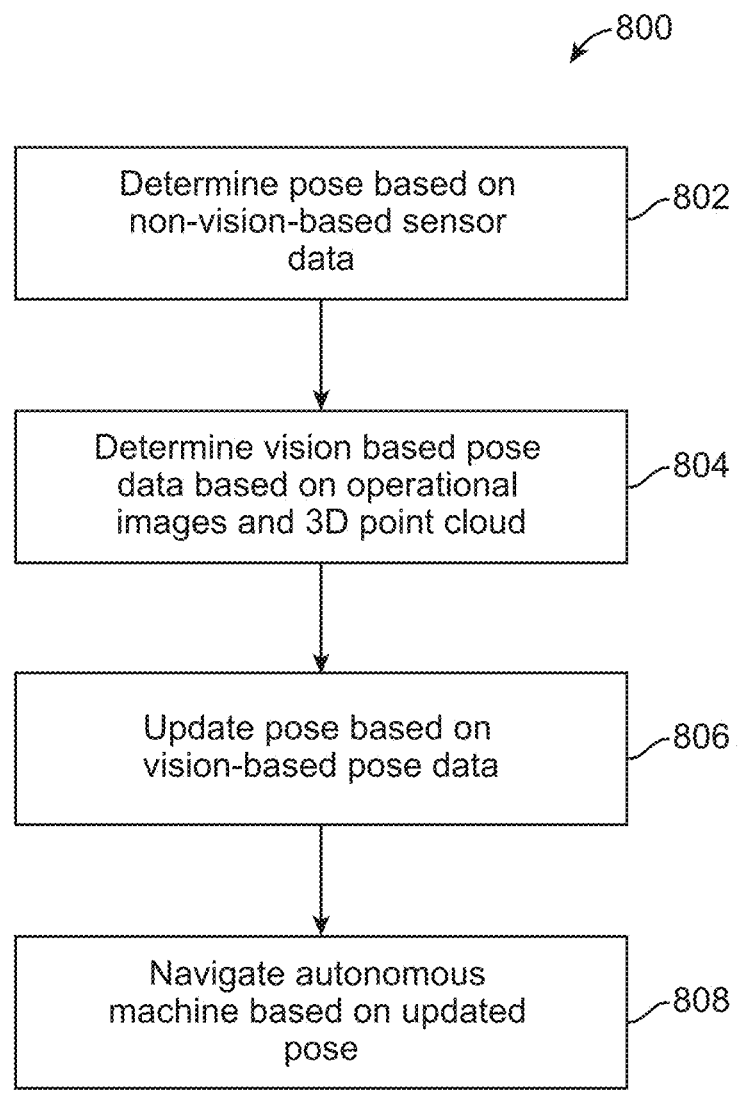
FIG. 17 is a flow diagram of an autonomous machine navigation method for operating the machine of FIG. 1 in accordance with one embodiment of the present disclosure.

In FIG. 17, a schematic representation of an autonomous machine navigation method 800 for operation is shown. In an online mode, a navigation system of the autonomous machine may be used to determine a pose of the autonomous machine based on non-vision-based sensor data at 802. For example, sensor data may be based on the output of an inertial measurement unit.

A vision system of the autonomous machine may be used to determine vision-based pose data based on received operational images obtained and a 3DPC generated based on feature data extracted from training images at 804. The vision-based pose data may be determined independently of the non-vision-based sensor data. In some embodiments, the vision-based pose data may be determined based at least in part on feedback from vision-based pose estimation or vison-based pose filtering.

The navigation system may update the predetermined pose based on the vision-based pose data at 806. The vision-based pose data may be updated at a slower rate than the rate at which the navigation system updates the pose. That is to say that the pose may be determined one or more times without input, or correction, from the vision-based pose data.

The navigation system may navigate the autonomous machine within a boundary of the work region based on the updated pose at 808. For example, the navigation system may be used to provide propulsion commands to a propulsion system of the autonomous machine.

Any suitable technique may be used to train the autonomous machine for navigation. In one or more embodiments, training methods of the autonomous machine may include one, two, or more different phases. The machine may also, during training, transition to a different mode, such as an offline mode, between different phases of the training mode. Further, before beginning various phases of the training mode, the autonomous machine may perform a battery check before beginning, which may ensure that the machine is capable of performing the tasks needed during each phase.

Figure 18:
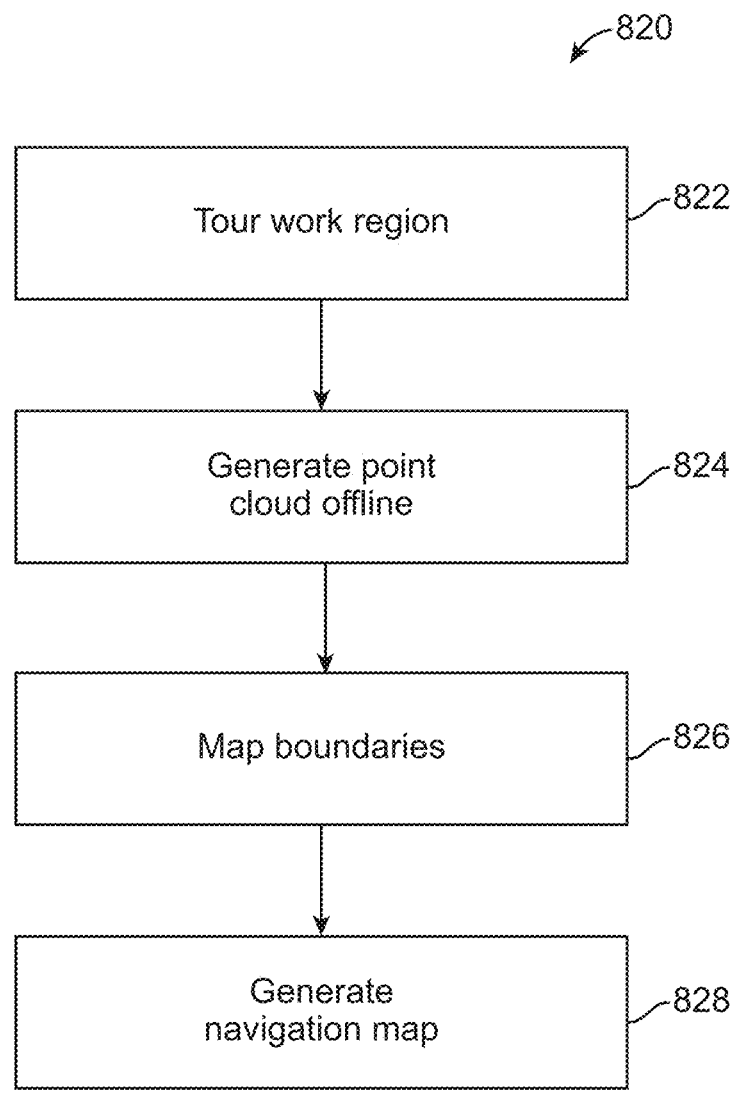
FIG. 18 is a flow diagram of another training method for training the machine of FIG. 1 in accordance with one embodiment of the present disclosure.

FIG. 18 shows one example of different phases used in a training method 820. In particular, the 3DPC and the boundaries may be trained in different phases, for example, compared to training method 700 of FIG. 16, which may train the 3DPC and the boundaries in a single phase. The training method 820 may include a touring phase at 822, in which the work region is toured by directing the autonomous machine in the work region. Images and other sensor data may be recorded during the touring phase.

The training method 820 may also include an offline phase at 824, in which the autonomous machine generates a 3DPC, for example, in an offline mode while docked in a base station. The point cloud may be generated using the images and other sensor data recorded during the touring phase.

Further, the training method 820 may include a mapping phase at 826, in which the autonomous machine is directed in the work region according to desired boundaries. The machine may be directed manually, which may include being pushed or driven by the user or being controlled remotely. Images and other sensor data may be recorded during the touring phase. For example, sensor fusion data may be used to determine the location of the autonomous machine along the paths.

Once the boundaries have been mapped, the training method 820 may include a map generation phase at 828, in which the autonomous machine generates a navigation map. The map generation phase at 828 may include generating the navigation map based on sensor fusion data recorded during the mapping phase. The navigation map may include some or all the boundaries trained by the user in the mapping phase.

The map generation phase at 828 may include generating a representation of one or more paths traversed by the autonomous machine during the mapping phase. For example, the representation of the one or more paths may be a visual representation displayed to the user on a user interface device. In some embodiments, a user interface device may be coupled to the autonomous machine for the touring phase or the mapping phase. One example of a user interface device is a smartphone, which may be physically docked with or coupled to the autonomous machine in a position that is visible to the user or may be operably connected by wireless or wired connection to the autonomous machine for remote operation of the machine.

In some embodiments, the one or more processes of the training method 820 may be repeated even after the navigation map has been tested and used for autonomous navigation. For example, a user may want to change one or more boundaries in response to physical changes in the work region (e.g., adding an exclusion zone with the addition of a flower bed to a yard) or changes in preference that may change over time. In such embodiments, the autonomous machine may be configured to repeat one or more of the touring phase at 822, the offline phase at 824, the mapping phase at 826, and the map generation phase at 828. For example, in some embodiments, only the mapping phase at 826 and the map generation phase at 828 may be repeated if the 3DPC does not need to be updated or regenerated.

Figure 19:
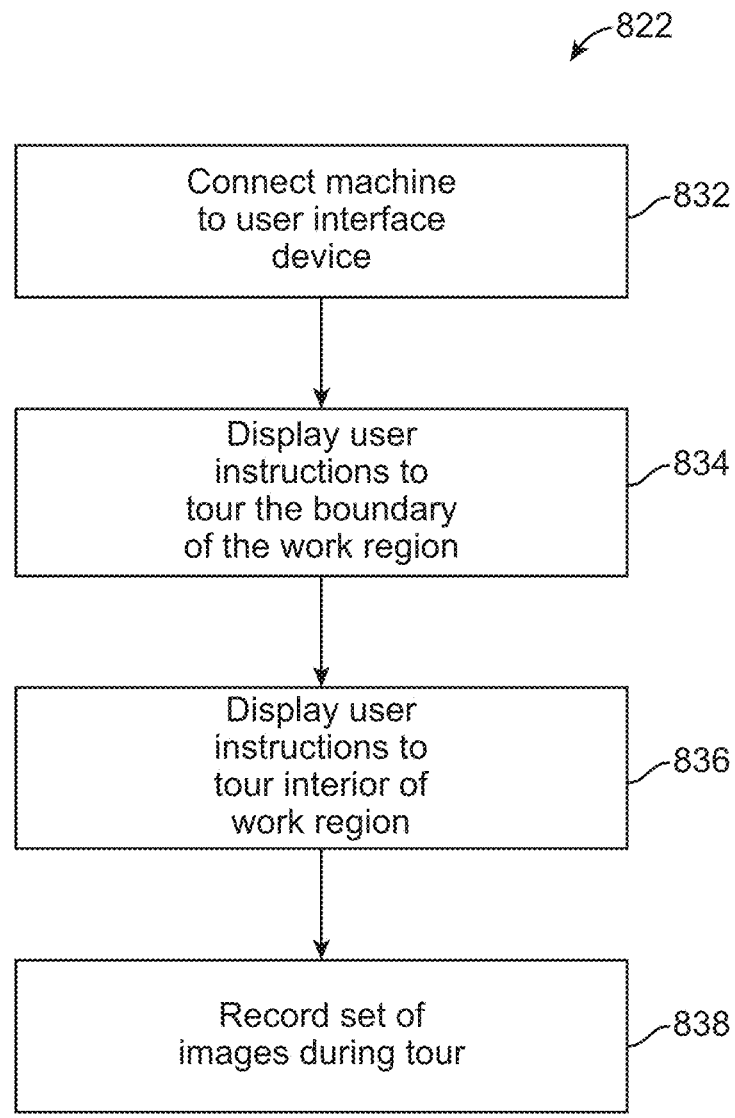
FIG. 19 is a flow diagram of a touring phase of the training method of FIG. 18 in accordance with one embodiment of the present disclosure.

FIG. 19 shows one example of the touring phase 822 that may be used in the overall training method 820. The touring phase 822 may include connecting the autonomous machine to the user interface device at 832. The touring phase 822 may also include instructing the user to tour various parts of the work region. As illustrated, the touring phase 822 may include displaying user instructions to the boundary of the work region at 834. The boundary of the work region may correspond to a perimeter, such as the outer perimeter, of the work region. This process allows the user to define the extent of the work region.

The touring phase 822 may also include displaying user instructions to tour the interior of the work region at 836. Touring the interior of the work region may provide images that may be processed to identify features for building a 3DPC. In one example, touring the interior of the work region may correspond to the autonomous machine being directed in a raster pattern to roughly cover a variety of areas of the work region. The raster pattern may not completely cover the entire work region.

The touring phase 822 may include recording a set of images during the tour at 838, for example, as the autonomous machine is directed along in the work region. The machine may be directed as instructed to the user. The recorded set of images may be processed to identify features. Non-vision-based sensor data, such as wheel encoder data or IMU data, may also be recorded during the touring phase 822.

In some embodiments, the touring phase 822 may include touring the perimeter, touring the interior, or both touring the perimeter and the interior. Touring the interior may only be requested, for example, when the features identified in the images recorded during touring of the perimeter are insufficient to build a robust 3DPC for autonomous navigation.

In other embodiments, the perimeter and the interior may be toured regardless of the results of the perimeter touring. Sets of images for the perimeter and the interior may be recorded in the same session or in different sessions. For example, both sets of images may be recorded without an offline phase between them. Each set of images may include one or more images captured by the vision system of the autonomous machine.

Figure 20:
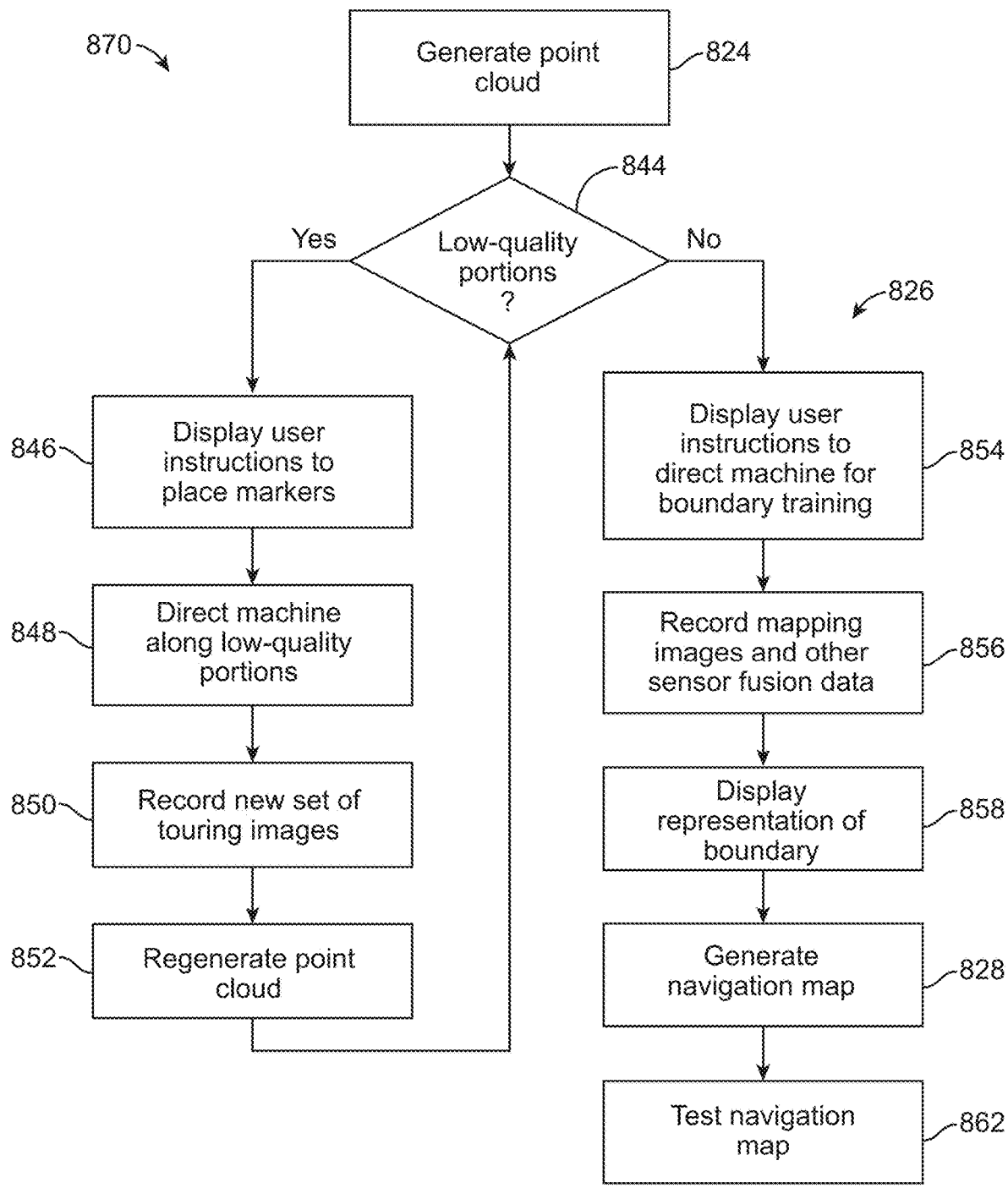
FIG. 20 is a flow diagram of a specific method for at least partially carrying out the training method of FIG. 18 in accordance with one embodiment of the present disclosure.

FIG. 20 shows one specific example of a method 870 that may be used to carry out at least part of the method 820. The method 870 may include generating the 3DPC at 824, which may be performed after a touring phase. The 3DPC may be analyzed, and a determination may be made regarding whether the 3DPC includes any low-quality portions at 844. If the one or more low-quality portions are insufficient or unacceptable for navigation based on the 3DPC, the method 870 may include performing an autonomous or manual supplemental training run to improve feature-density in the low-quality portions identified.

In some cases, the 3DPC may be insufficient for navigation if the quality level of the 3DPC does not meet a quality threshold. The presence of one, two, or more low-quality portions may be enough to determine that the quality level of the 3DPC is insufficient. In some embodiments, the method 870 may include determining that the 3DPC is sufficient for navigation even when one or more low-quality portions are present. For example, the mower may use non-low-quality portions of the 3DPC near the low-quality portions for position correction or updating during navigation. Further, the autonomous machine may use images during other training modes or operation to improve the 3DPC periodically without performing a dedicated supplemental training run.

The method 870 may include displaying user instructions to place markers at 846. In some embodiments, the user instructions may be displayed on a smartphone of the user. The markers, or targets, may be discernable by sensor data. For example, the markers may be visible to the vision system, and the vision system may identify one or more artificial features of the marker for use in generating a 3DPC. The markers may be temporarily or permanently placed in the work region for future navigation.

The autonomous machine may be directed along the low-quality portions identified at 848. The machine may be directed autonomously, using sensor fusion to navigate non-low-quality portions of the work region, or manually by the user, which may be done physically or using a remote control. As the machine is directed along the work region, a new set of touring images may be recorded to capture features, which may be artificial features, in the low-quality portions identified at 850.

In response to the new set of touring images have been recorded, the machine may return to the docking station for offline mode. During offline mode, the method 870 may include regenerating the 3DPC based on the new set of touring images at 852. The processes to remedy the low-quality portions of the 3DPC may be repeated if needed.

In some embodiments, a new set of touring images may be recorded repeatedly, or periodically, and the 3DPC may be regenerated alternatively or in addition to detecting low-quality portions. The repeated recorded of a new set of touring images may be used to adjust the 3DPC and navigation map to seasonal variations or other changes in the work region. For example, a new set of touring images may be set to be recorded four times per year or once per local season.

The method 870 may include performing processes to define specific boundaries within the work region at 826. In some embodiments, defining specific boundaries may be performed after determining that the 3DPC is acceptable or sufficient for generating the 3DPC or in response to one or more low-quality portions of the 3DPC being remedied. The method 870 may include displaying user instructions to direct the machine for boundary training at 854. The user may select or be instructed to train various types of boundaries, such as an exclusion zone, a transit zone, or a containment zone. One or more of these boundaries may be trained by directing the autonomous machine along one or more paths representing these boundaries. The autonomous machine may be directed by the user manually, which may be done physically or using remote control.

As the machine is directed, mapping images and other sensor fusion data may be recorded at 856. In particular, the machine may record sensor fusion data, which can use non-vision-based sensor data to determine a position, which may be localized or corrected using vision system data and the 3DPC. In particular, the position may be localized to the coordinate system defined by the 3DPC.

The method 870 may include displaying a representation of the one or more paths traversed by the machine before boundaries are defined. In one example, a rough shape of the path traversed by the machine may be displayed to the user on a user interface device, such as a smartphone, before the related boundaries are defined. In some embodiments, after the machine traverses a path for each boundary, a visual representation may be compiled and shown, and the user may confirm that the representation is acceptable before proceeding to train the next boundary.

Various techniques may be used to compile the rough shape shown to the user. In some embodiments, the rough shape may be generated based on a raw position of the autonomous machine determined by sensor fusion data. The positions of the wheels of the autonomous machine may be determined from sensor fusion data and used to define the rough shape. In particular, the wheels may be used as the vertices of a trapezoidal shape that is used to "paint" the path of the machine. In some embodiments, the raw position data may be smoothed for use in generating the representation.

In one or more embodiments, the visual representation associated with each path may be based on an outer perimeter of the respective path. For example, a user may direct the machine into a corner of the work region and move the machine back and forth to turn the machine while covering the edges of the work region near the corner. Instead of showing all of the back and forth motion in the visual representation, the outer perimeter of the machine's path is shown as the rough shape.

The method 870 may include generating a navigation map at 828, for example in an offline mode. The navigation map may define the one or more trained boundaries. The navigation map may be generated and stored separately from the 3DPC. The coordinate system of the navigation map may be localized to the coordinate system of the 3DPC, for example, when sensor fusion data is used to generate the boundaries. The navigation map may be generated as a 2D or 3D representation of the boundaries of the work region. The navigation map may be generated during the map generation phase of the training mode or during an offline mode. In some embodiments, the navigation map may be displayed to the user, including the trained boundaries, via the user interface device. The trained boundaries may appear differently to the user than the visual representations of the paths due, for example, to localization or correction using the vision-based sensor data and the 3DPC.

The navigation map may be used for operation of the autonomous machine within the work region. In some embodiments, the method 870 may include testing the navigation map before using the navigation map to operate the autonomous machine at 862 after generating the navigation map. For example, the machine may autonomously traverse the paths or trained boundaries. If the test is successful, the navigation map may be used for autonomous operation of the machine in the work region, for example, to perform mowing tasks in the work region. The 3DPC or boundaries may be retrained or redefined as needed.

Figure 21:
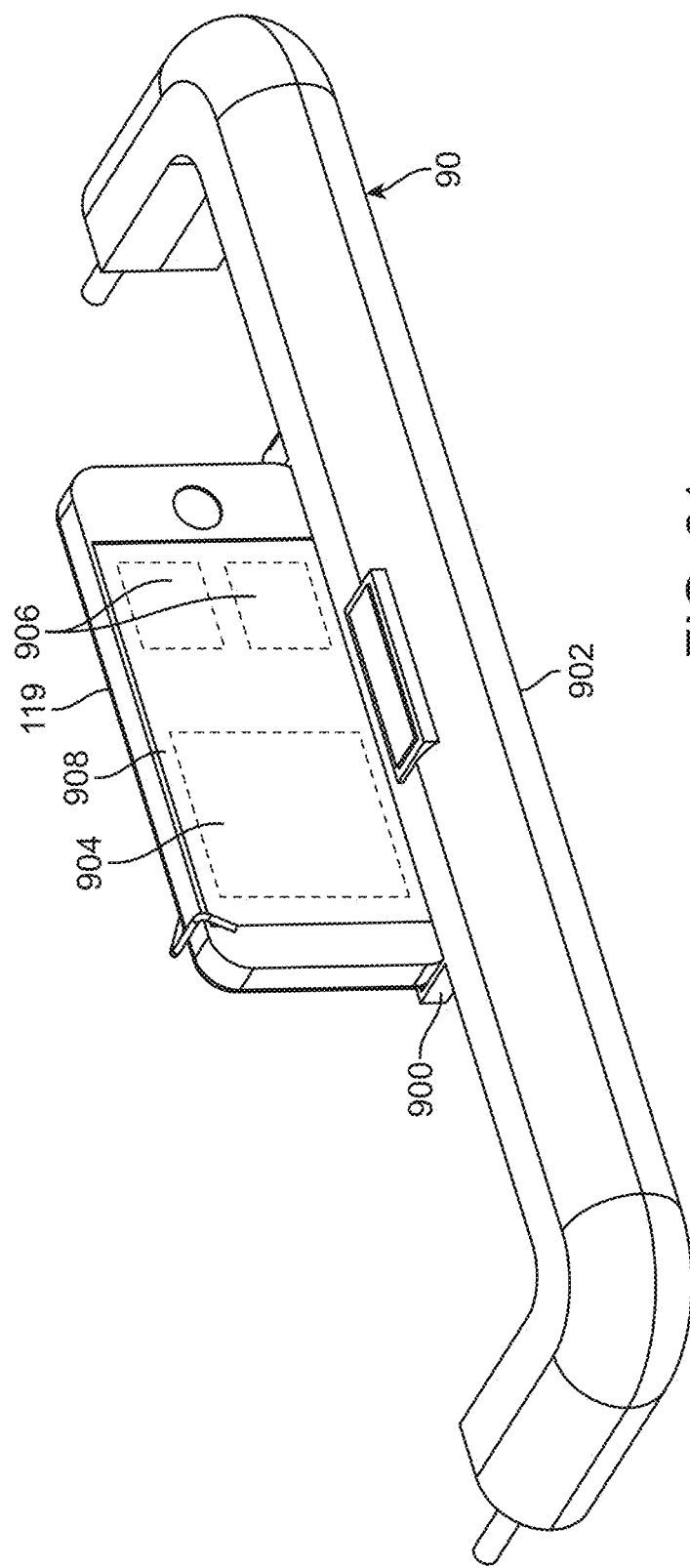
FIG. 21 is a perspective illustration of a handle assembly that may be used in the machine of FIG. 1 in accordance with one embodiment of the present disclosure.

FIG. 21 shows one example of the handle assembly 90. In some embodiments, a cradle 900 may be attached to the grip portion 902 of, and be part of, the handle assembly 90. The cradle 900 may be adapted to receive and hold the mobile device 119 (e.g., smartphone) in an orientation visible to the operator while standing or walking behind the housing (when the handle assembly is in the manual mode position). The mobile device 119 may support a communication protocol compatible with a radio 117 (FIG. 1) of the mower 100 for reasons further described below. Alternatively, the mower 100 and cradle 900 may include provisions for a wired connection (e.g., serial, Universal Serial Bus, etc.) to the controller 120 (FIG. 1) of the mower 100. Regardless of the control interface provided to the operator, he or she may control and manipulate the mower by interacting with controls associated with the handle assembly 90 (e.g., with virtual controls on the mobile device).

In order to operate autonomously, the boundaries of the work region is trained and stored in the mower 100. While various boundary detection systems are known, mowers in accordance with embodiments of the present disclosure may determine the bounds of the work region by initially undergoing a training procedure or phase as described in more detail below. In the training mode, the mower is configured in the manual mode in which the handle assembly may be in a manual ode position.

The cradle 900 may receive therein a mobile device 119 (e.g., smartphone) that supports a communication protocol (wired or wireless) compatible with the radio 117 of the mower 100. For example, the mobile device 119 may support short-range wireless communication via the Bluetooth wireless protocol. The controller 120 may communicate with the mobile device 119 to present various controls and operator feedback in the training mode of the mower as further described below.

To enter the training mode, the handle assembly 90 may (if not already in position) first be deployed or moved from the first or autonomous mode position to the second or manual mode position. After the handle assembly is in place, the mobile device 119 may be placed in the cradle 900 as described above. The operator may then initiate communication between the mobile device 119 and the controller 120. This initiation may involve pairing or otherwise connecting the mobile device 119 to the mower 100 so that the two devices may wirelessly communicate with one another. While described herein as wireless communication (e.g., Bluetooth), alternate embodiments could again provide a wired interconnection. The operator may then launch application-specific software on the mobile device that presents status information 904 to the operator in the training mode. The software may further permit the operator to issue commands during the training process via inputs provided by virtual buttons 906 that appear on the display 908. For example, the application may allow the operator to, among others, issue commands and receive instructions directed to: entering the training mode; starting/stopping recording of data related to the traversal of a boundary of a work region, an exclusion zone, or a transit zone; and when to push or drive the mower along an identified boundary or path.

When the operator is ready to initiate the training mode, the mower may be pushed, using the handle assembly 90, to a perimeter of the work region (or to a perimeter of an exclusion zone). At this point, training may begin by selecting the appropriate training mode (e.g., a boundary training mode for the work region or an exclusion zone, or a transit zone training mode) presented on the display 166. In the case of the boundary training mode, the operator may then commence to traverse the boundary of the work region.

During the boundary training mode, the mower 100 may record data associated with the boundary as the mower traverses the boundary. The mower 100 may further (via the application software running on the mobile device 119) present various status information (see, e.g., 904) of the training mode to the operator during traversal/training. For instance, the display 908 may plot, in real-time, zone coordinates of the mower during perimeter recording. In addition, the display 908 may present instructions requesting that the operator change (e.g., reduce) mower speed. Maintaining mower speed below a threshold during training may be important, especially for vision-based systems, to ensure that the mower is able to capture sufficient data.

Such speed-related instructions/feedback may be presented textually or graphically to the operator. For example, feedback and/or other status information may be presented as a quantitative speed indicator (e.g., speedometer), or a speed-related icon or object (e.g., an icon that changes color: green for acceptable speed, yellow or red for unacceptable speed). In other embodiments, the display 908 could indicate whether a change in speed is needed by showing a speedometer reading alongside a desired target speed or showing "up" or "down" arrows to indicate a faster or slower speed is recommended. In yet other embodiments, the display could provide a simplistic "pass/fail" indicator or provide audible indicators (via the mobile device 119 or the mower/controller) during or after the training mode.

Figure 22:
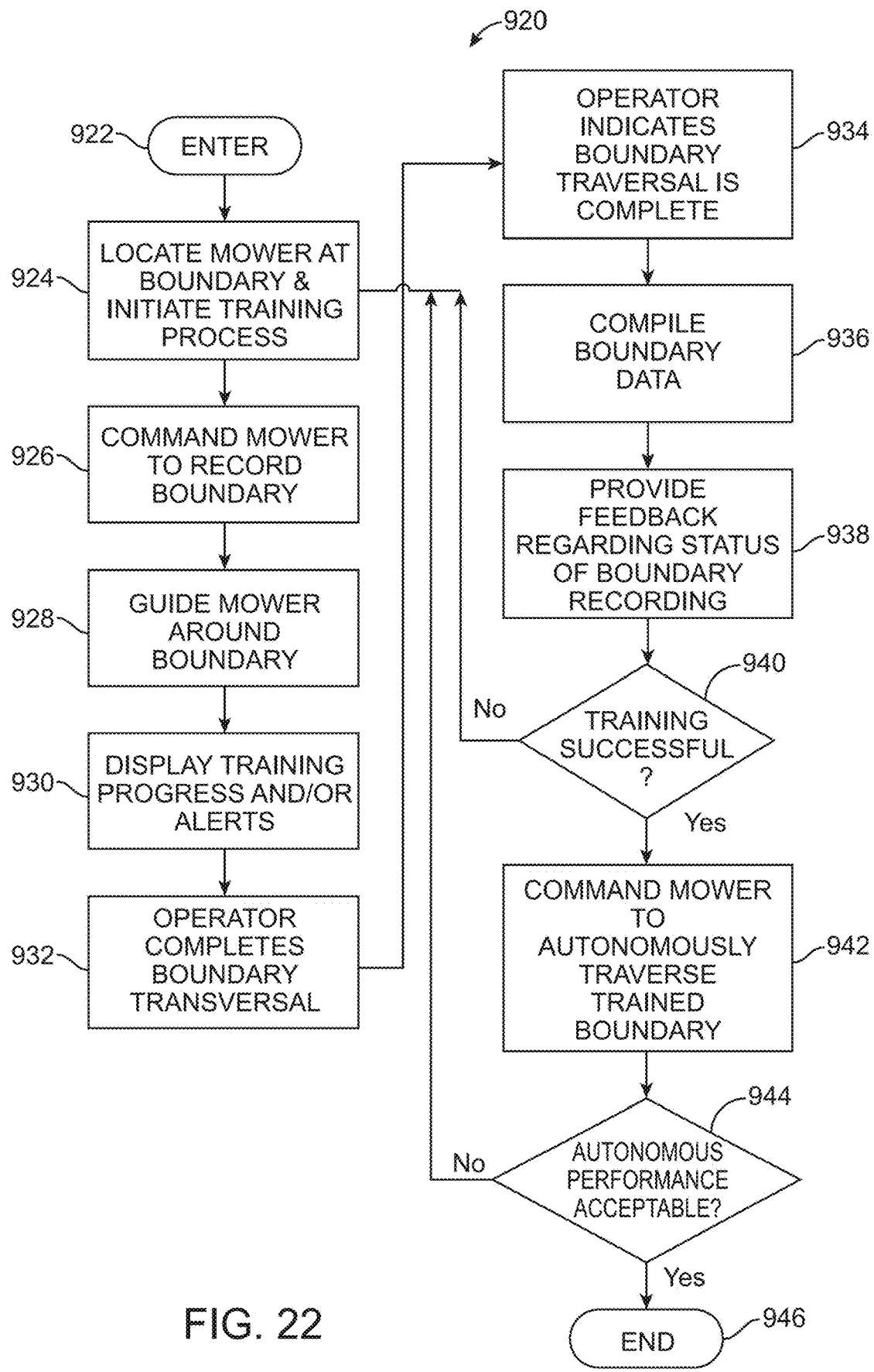
FIG. 22 is a flow diagram of yet another training method for training the machine of FIG. 1 in accordance with one embodiment of the present disclosure.

FIG. 22 illustrates an exemplary method 920, or process, for training the mower 100 (FIG. 1) with regard to boundaries. In some embodiments, method 920 may be part of the mapping phase of the training mode. It is noted that this process describes only an exemplary boundary training method. It is understood that other operations may need to occur before or after the method 920 in order to permit autonomous operation of the mower. However, these other operations are not specifically addressed herein. The operator may first train a boundary of the work region, and then proceed to train exclusion zones and transit zones. This method assumes that the mower 100 is positioned at or near a boundary of a work region or at or near a boundary of one of the exclusion zones. The method 920 will be described in the context of training the boundary of the work region, but the method would apply, with slight variation, to the exclusion zone boundaries or transit zone boundaries or paths, as well.

The method 920 is entered at 922. Once the mower 100 is located along the boundary, the training mode or mode may be initiated at 924. Initiating training may include deploying the handle (e.g., moving the handle to the manual mode position as described herein), locating the mobile device 119 (FIG. 1) in the cradle 900 (FIG. 21) and interacting with the software running on the mobile device. Once initiated, the operator may select whether the boundary to be trained is a work region boundary, an exclusion zone boundary, or a transit zone boundary or path.

The operator may command the mower, for example, via interaction with the display 166 (FIG. 21) of the mobile device 119 to record mower movement at 926 as the mower traverses the boundary. Once recording is initiated, the mower 100 may utilize a variety of sensors (e.g., GPS, wheel encoders, vision systems, lidar, radar, etc.) to record its travel path as the mower 100 is manually guided, pushed, or driven around the boundary. In some embodiments, the mower may provide an assistive torque to the rear wheels 106 (FIG. 1) to assist the operator as the mower is guided around the boundary. Moreover, the cutting blade 110 (FIG. 1) could be either active or inactive in the training mode. Activating the cutting blade 110 during training could provide feedback as to the actual cutting path the mower will make as it is guided about the boundary. If cutting blade 110 actuation is allowed, it may be controlled by an option presented on the display 166 during training. Such operation may necessitate the use of operator presence controls (e.g., on the handle itself or on the display 166 of the mobile device 119).

Because a cutting width of the mower 100 may be narrower than the width of the housing 102 (FIG. 1), the top of the housing 102 may include visual markings that indicate to the operator the cutting width of the mower. Such markings may be useful to the operator when the blade 110 is unpowered in the training mode.

As the mower is pushed, guided, or driven around the boundary, the mower 100 (for example, via the display 166) may optionally indicate to the operator training status and/or training alerts at 930. For example, the controller 120 may graphically or audibly recommend slowing ground speed to improve data capture.

Once the operator and mower have completed traversal of the boundary (e.g., moved slightly beyond the original starting point) at 932, the operator may indicate (e.g., via the mobile device) that boundary traversal is complete at 934. The controller 120 and/or the mobile device 119 may then compile the boundary data collected to ultimately create a mapped boundary path of the work region (or exclusion zone or transit zone or path) at 936.

The mower may provide (via an onboard display or via the mobile device 119) feedback regarding status of the training process (e.g., status of boundary recording) at 938. For example, at completion, the mower 100 may provide an indication on the mobile device that the boundary training was successful (e.g., the data satisfies predetermined path criteria) by displaying a status such as a simple "pass/fail" indication at 938. Path criteria that may affect training success includes determining whether the mapped boundary path defines a bounded area (e.g., forms an enclosed or bounded area or shape). Other path criteria may include determining whether bottlenecks are present. A bottleneck may exist, for example, when a mapped boundary path of the work region is within a threshold distance of an object or another mapped boundary path (e.g., the boundary is too close—such that a path width is insufficient for the mower to easily pass—to another boundary path.

If the training is successful at 940, the operator may move the handle assembly to the first or autonomous mode position and command the mower 100 to autonomously traverse the trained boundary of the work region (and/or exclusion zones or transit zones or paths) at 942. Assuming the operator concludes that the trained paths are acceptable at 944, the method ends at 946. If, on the other hand, it is determined that training was unsuccessful at 940, or the operator finds autonomous operation to be unacceptable at 944, the method may return to 924 and training (or a portion thereof) re-executed. The method may then be repeated for each boundary (including exclusion zones) and transit zones. In some embodiments, the software running on the mobile device 119 may permit the operator to revise, add, and/or delete some or all of a boundary or portion thereof during the method 920.

In addition to containment/exclusion zone training, the mower 100 may also be trained to utilize one or more "return-to-base" transit zones ("RTB transit zones") using the handle assembly 90 in the manual mode position. That is, the mower 100 may also be trained as to what path or paths it should use to return to the base station 258 (FIG. 3). Training RTB transit zones may be useful to assist or expedite the mower's return to the base station to, for example, account for complex yards, or to otherwise allow the operator to constrain the mower's preferred return path. Any number of RTB transit zones may be trained. During autonomous operation, the mower 100 may guide itself to the nearest RTB transit zone and then follow that path to the base station 258 when operation is complete or the mower battery needs re-charging. Of course, to permit RTB transit zone training, the mower/controller may also permit the operator to establish or otherwise train a "home" location of the base station 258.

Before autonomous mowing may take place, the yard or work region may be mapped. Yard mapping involves defining the mowing area (e.g., work region perimeter), defining all exclusion zones, identifying the "home" position for the base station 258, and optionally identifying transit zones.

Figure 23:
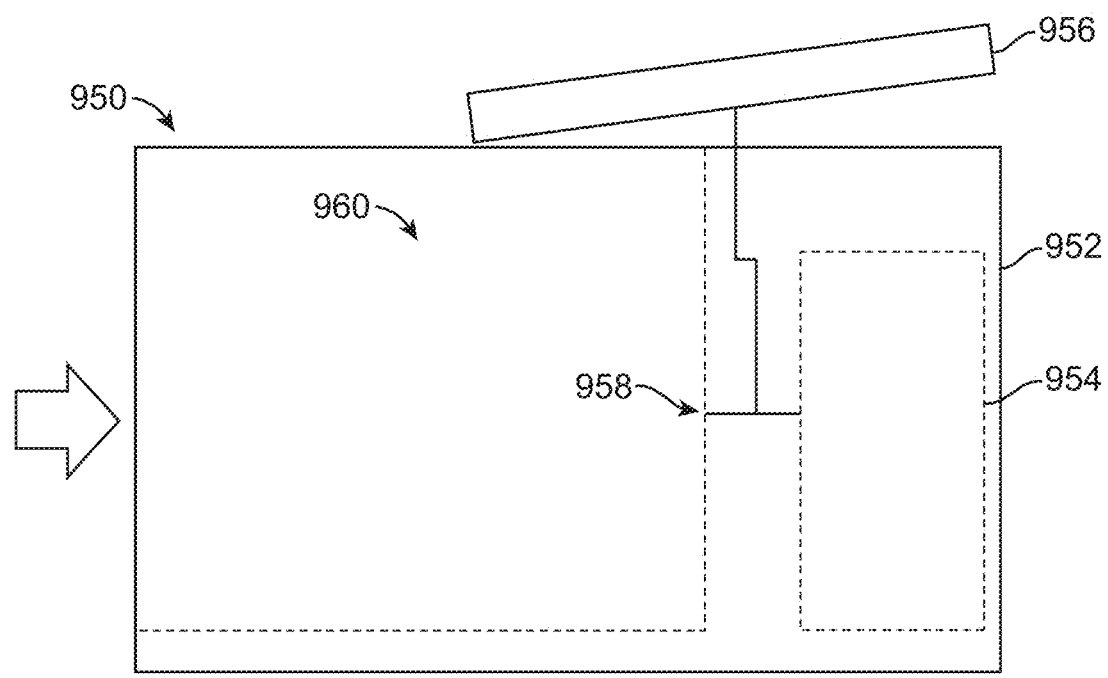
FIG. 23 is a schematic representation of the base station of FIG. 3 in accordance with one embodiment of the present disclosure.

FIG. 23 shows one example of a base station that may be used as the base station 258 (FIG. 3). As illustrated, the base station 950 includes a housing 952 defining a storage location 960 for the mower 100. Charging connections 958 may be exposed to the storage location 960 for the mower 100 to connect for recharging. The base station 950 may include a solar panel 956 coupled to the housing 952 and operably coupled to the charging connections 958. Energy generated by the solar panel 956 may be used to recharge the mower 100 directly or indirectly. The solar panel 956 may be coupled to the charging connections 958, to an optional battery 954, or to both. In some embodiments, the solar panel 956 may directly charge the mower 100 through charging connections 958 during the daytime. In some embodiments, the solar panel 956 may indirectly charge the mower 100 by charging the battery 954 during the daytime, which is used to charge the mower 100 through charging connections 958 during the daytime or the nighttime.

The base station 950 may optionally be coupled to an external power source, such as a building electrical outlet. The base station 950 having the solar panel 956, the battery 954, or both may continue to operate even when an external power source is not available (e.g., due to power loss).

In some embodiments, the base station 950 is not plugged in to an external power source and does not power a boundary wire to facilitate defining a boundary. The mower 100 may continue to operate and navigate even when the base station 950 loses all power from any of the sources, such as solar panel 956 or the battery 954, for example, when navigation does not rely upon a boundary wire powered by the base station 950. In other embodiments, the base station 950 may power a boundary wire and be plugged into an external power source.

ILLUSTRATIVE EMBODIMENTS

While the present disclosure is not so limited, an appreciation of various aspects of the disclosure will be gained through a discussion of the specific illustrative embodiments provided below. Various modifications of the illustrative embodiments, as well as additional embodiments of the disclosure, will become apparent herein.

In embodiment A1, a method for autonomous machine navigation comprises:
  determining a current pose of an autonomous machine based on non-vision-based pose data captured by one or more non-vision-based sensors of the autonomous machine, wherein the pose represents one or both of a position and an orientation of the autonomous machine in a work region defined by one or more boundaries;
  determining vision-based pose data based on image data captured by the autonomous machine; and
  updating the current pose based on the vision-based pose data to correct or localize the current pose and to provide an updated pose of the autonomous machine in the work region for navigating the autonomous machine in the work region.

In embodiment A2, a method comprises the method according to embodiment A1, wherein determining the vision-based pose data comprises matching the image data to one or more points of a three-dimensional point cloud (3DPC) that represents the work region.

In embodiment A3, a method comprises the method according to embodiment A2, further comprising:
  capturing training image data using the autonomous machine;
  generating the 3DPC based on:
    feature data that contains two-dimensional features extracted from the training image data; and
    matching data that relates features in the feature data from different training images of the training image data.

In embodiment A4, a method comprises the method according to embodiment A3, wherein generating the 3DPC further comprises:
  rejecting matches below a matching threshold in the matching data;
  initializing a partial 3DPC using feature data corresponding to a first and a second training image;
  selecting a third training image with overlapping correspondence with the partial 3DPC;
  using the third training image to estimate a vision-based pose of the autonomous machine relative to the partial 3DPC using matching data associated with the third training image and matching data associated with the first and second training images;
  using the third training image to estimate locations of any new features relative to the partial 3DPC using matching data associated with the third training image and matching data associated with the first and second training images; and
  updating the partial 3DPC using a graph optimizer on the estimated locations of features and used training images.

In embodiment A5, a method comprises the method according to embodiment A4, further comprising selecting additional unused training images with overlapping correspondence with the partial 3DPC and continuing to estimate poses and locations for each training image.

In embodiment A6, a method comprises the method according to embodiment A5, further comprising storing the 3DPC in response to having no unused training images available.

In embodiment A7, a method comprises the method according to any embodiment A3-A6, wherein the 3DPC is generated to define points in a coordinate system based on an arbitrary frame of reference.

In embodiment A8, a method comprises the method according to any embodiment A3-A7, further comprising:
  recording a set of touring images associated with the autonomous machine traversing one or both of a perimeter and an interior of the work region to provide at least part of the training image data;

generating the 3DPC based on the set of touring images of the training image data;

recording a set of mapping images to provide at least part of the training image data after generating the 3DPC; and determining the one or more boundaries of the work region based on the set of mapping images and the 3DPC.

In embodiment A9, a method comprises the method according to embodiment A8, wherein recording the set of touring images comprises:

recording a first set of touring images associated with the autonomous machine traversing the perimeter of the work region;

optionally recording a second set of touring images associated with the autonomous machine traversing an interior of the work region inside of the perimeter; and generating the 3DPC based on the first and second sets of touring images.

In embodiment A10, a method comprises the method according to any embodiment A8-A9, further comprising determining whether a quality level of the 3DPC does not meet a quality threshold before recording the set of mapping images.

In embodiment A11, a method comprises the method according to embodiment A10, further comprising determining a quality level of the 3DPC based on at least one of: a number of poses reconstructed, a number of points reconstructed, reprojection error, point triangulation uncertainty, and reconstructed pose uncertainty.

In embodiment A12, a method comprises the method according to any embodiment A10-A11, further comprising:

recording a new set of touring images in the work region in response to determining that the quality level of the 3DPC does not meet a quality threshold; and regenerating the 3DPC based on the new set of touring images.

In embodiment A13, a method comprises the method according to any embodiment A7-A12, further comprising registering the coordinate system of the 3DPC to a real-world scale and orientation in a navigation map.

In embodiment A14, a method comprises the method according to embodiment A13, further comprising autonomously operating the autonomous machine in the work region based on the navigation map.

In embodiment A15, a method comprises the method according to any embodiment A13-A14, further comprising testing the navigation map by navigating the autonomous machine within the work region based on the navigation map before autonomously operating the autonomous machine in the work region.

In embodiment A16, a method comprises the method according to any embodiment A3-A15, wherein the 3DPC is generated or regenerated during an offline mode of the autonomous machine while operably coupled to a base station for charging.

In embodiment A17, a method comprises the method according to embodiment A16, further comprising performing a battery check before leaving the offline mode.

In embodiment A18, a method comprises the method according to any preceding A embodiment, further comprising recording a new set of image data periodically.

In embodiment A19, a method comprises the method according to any preceding A embodiment, wherein:

the work region is an outdoor area;

the autonomous machine is a grounds maintenance machine; or the work region is a lawn and the autonomous machine is a lawn maintenance machine.

In embodiment A20, a method comprises the method according to any preceding A embodiment, wherein the one or more boundaries of the work region are used to define one or more of a perimeter of the work region, a containment zone in the work region, an exclusion zone in the work region, or a transit zone in the work region.

In embodiment A21, a method comprises the method according to any preceding A embodiment, wherein each pose represents one or both of a three-dimensional position and a three-dimensional orientation of the autonomous machine.

In embodiment A22, a method comprises the method according to any preceding A embodiment, further comprising determining the one or more boundaries of the work region based on non-vision-based pose data and vision-based pose data for subsequent navigation of the autonomous machine in the work region.

In embodiment A23, a method comprises the method according to any preceding A embodiment, wherein determining the current pose of the autonomous machine based on non-vision-based pose data is repeated at a first rate and updating the current pose based on the vision-based pose data is repeated at a second rate slower than the first rate.

In embodiment A24, a method comprises the method according to any preceding A embodiment, wherein non-vision-based pose data comprises one or both of an inertial measurement data and wheel encoding data.

In embodiment A25, a method comprises the method according to any embodiment A2-A24, further comprising associating points in the 3DPC with at least one of: one or more images, one or more descriptors, one or more poses, position uncertainty, and pose uncertainty for one or more poses.

In embodiment A26, a method comprises the method according to any embodiment A2-A25, wherein the feature data comprises a two-dimensional position and a multi-dimensional descriptor.

In embodiment A27, a method comprises the method according to any preceding A embodiment, wherein determining vision-based pose data is based at least in part on feedback from vision-based pose estimation or vision-based pose filtering.

In embodiment B1, a method of navigation training for an autonomous machine comprises:

directing the autonomous machine during a touring phase of a training mode along at least one of a perimeter or an interior of a work region to record a first set of touring images associated with the perimeter or a second set of touring images associated with the interior;

generating during an offline mode a three-dimensional point cloud (3DPC) based on at least one of the first set and the second set of touring images; and directing the autonomous machine during a mapping phase of the training mode along one or more paths to record sensor fusion data to define one or more boundaries for the work region in a navigational map.

In embodiment B2, a method comprises the method according to embodiment B1, wherein directing the autonomous machine during the mapping phase of the training mode along one or more paths comprises:

evaluating at least one of the one or more boundaries defined based on sensor fusion data;

determining whether the at least one boundary satisfies a path criterion; and displaying a status of the mapping phase based on whether the at least one boundary satisfies the path criterion.

In embodiment B3, a method comprises the method according to embodiment B2, wherein displaying the status of the mapping phase occurs during traversal of the boundary of the work region.

In embodiment B4, a method comprises the method according to any embodiment B2-B3, wherein determining whether the at least one boundary satisfies a path criterion comprises determining whether the at least one boundary defines a bounded area.

In embodiment B5, a method comprises the method according to any preceding B embodiment, further comprising:
deploying a handle assembly connected to a housing of the autonomous machine from a first position to a second position; and
placing a mobile computer comprising a user interface on a cradle attached to the handle assembly for the training mode.

In embodiment B6, a method comprises the method according to embodiment B5, further comprising:
returning the handle assembly to the first position; and
directing the autonomous machine to traverse the boundary of the work region autonomously.

In embodiment B7, a method comprises the method according to any preceding B embodiment, further comprising:
directing the autonomous machine, in response to determining that a quality level of the 3DPC does not meet a quality threshold, to record a new set of touring images for one or more areas of the work region associated with one or more low-quality portions of the 3DPC; and
regenerating during the offline mode the 3DPC based on at the new set of touring images.

In embodiment B8, a method comprises the method according to embodiment B7, further comprising deploying one or more artificial features along the one or more areas of the work region associated with one or more low-quality portions of the 3DPC before directing the autonomous machine to record the new set of touring images.

In embodiment B9, a method comprises the method according to any preceding B embodiment, further comprising displaying a representation of the one or more paths to a user before defining the one or more boundaries in the navigational map.

In embodiment B10, a method comprises the method according to embodiment B9, wherein the representation associated with each path is based on an outer perimeter of the respective path.

In embodiment B11, a method comprises the method according to any preceding B embodiment, further comprising operatively coupling a user interface device to the autonomous machine for the touring phase or the mapping phase.

In embodiment B12, a method comprises the method according to embodiment B11, further comprising:
initiating communication between the user interface device and an electronic controller associated with autonomous machine; and
entering the training mode of the autonomous machine via interaction with the user interface device.

In embodiment B13, a method comprises the method according to any preceding B embodiment, further comprising displaying instructions to a user to manually direct the autonomous machine along the perimeter, the interior, or both of the work region for the touring phase or the mapping phase of the training mode.

In embodiment B14, a method comprises the method according to any preceding B embodiment, wherein the one or more boundaries are used to define one or more of a perimeter of the work region, a containment zone in the work region, an exclusion zone in the work region, or a transit zone in the work region.

In embodiment C1, an autonomous machine is adapted to carry out a method according to any A or B embodiment.

In embodiment C2, a machine comprises the machine according to embodiment C1, further comprising:
a housing coupled to a maintenance implement;
a set of wheels supporting the housing over a ground surface;
a propulsion controller operably coupled to the set of wheels;
a vision system comprising at least one camera adapted to capture image data; and
a navigation system operably coupled to the vision system and the propulsion controller, the navigation system adapted to direct the autonomous machine within the work region.

In embodiment C3, a machine comprises the machine according to embodiment C2, wherein the propulsion controller is adapted to control speed and rotational direction of the wheels independently, thereby controlling both speed and direction of the housing over the ground surface.

In embodiment C4, a machine comprises the machine according to any embodiment C2-C3, wherein the at least one camera adapted to capture image data provides a total horizontal field of view of at least 90 degrees around the autonomous machine.

In embodiment D1, a method for autonomous machine navigation comprises:
generating a three-dimensional point cloud that represents at least a work region based on:
feature data containing two-dimensional features extracted from training images, and
matching data relating features in the feature data from different training images;
generating pose data associated with points of the three-dimensional point cloud that represents poses of an autonomous machine; and
determining a boundary using the pose data for subsequent navigation of the autonomous machine in the work region.

In embodiment D2, a method comprises the method according to embodiment D1, wherein determining the boundary is based on non-vision-based sensor data and pose data.

In embodiment D3, a method comprises the method according to any preceding D embodiment, wherein the pose data comprises at least a three-dimensional position that represents a pose of the autonomous machine during a training mode.

In embodiment E1, an autonomous machine comprises:
a housing coupled to a maintenance implement;
a set of wheels supporting the housing over a ground surface;
a propulsion controller operably coupled to the set of wheels, wherein the propulsion controller is adapted to control speed and rotational direction of the wheels independently, thereby controlling both speed and direction of the housing over the ground surface;

a vision system comprising at least one camera adapted to record training images and a controller adapted to:
generate a three-dimensional point cloud that represents at least a work region based on feature data containing two-dimensional features extracted from the training images and matching data relating features in the feature data from different training images; and
generate pose data associated with points of the three-dimensional point cloud that represents poses of the autonomous machine; and
a navigation system operably coupled to the vision system and the propulsion controller, the navigation system adapted to:
direct the autonomous machine in the work region to record training images; and
determine a boundary using non-vision-based sensor data and the pose data for subsequent navigation of the autonomous machine in the work region.

In embodiment E2, an autonomous machine comprises:
a housing coupled to a maintenance implement;
a set of wheels supporting the housing over a ground surface;
a propulsion controller operably coupled to the set of wheels, wherein the propulsion controller is adapted to control speed and rotational direction of the wheels independently, thereby controlling both speed and direction of the housing over the ground surface;
a vision system comprising at least one camera adapted to record images and a controller adapted to provide vision-based pose data based on received operational images and a three-dimensional point cloud generated based on feature data extracted from training images; and
a navigation system operably coupled to the vision system and the propulsion controller, the navigation system adapted to:
determine a pose based on non-vision-based sensor data;
update the pose based on the vision-based pose data; and
command the propulsion controller based on the updated pose.

In embodiment E3, a machine comprises the machine according to any preceding E embodiment, wherein non-vision-based sensor data comprises at least one of inertial measurement data and wheel encoding data.

In embodiment F1, an autonomous machine comprises:
a housing coupled to a maintenance implement;
a set of wheels supporting the housing over a ground surface;
a propulsion controller operably coupled to the set of wheels;
a vision system comprising at least one camera configured to record touring images and a controller configured to:
record during a touring phase of a training mode at least one of a first set of touring images associated with a perimeter of a work region or a second set of touring images associated with an interior of the work region while the autonomous machine is directed along at least one of the perimeter or the interior of the work region;
generate during an offline mode a three-dimensional point cloud based on at least one of the first set and the second set of touring images;
record, during a mapping phase of the training mode, sensor fusion data for the work region while the autonomous machine traverses along one or more paths; and
a navigation system operably coupled to the vision system and the propulsion controller, the navigation system comprising a controller configured to:
determine a navigation map for the work region that represents one or more boundaries based on the sensor fusion data recorded along the one or more paths; and
direct the autonomous machine in the work region based on the navigation map.

In embodiment F2, a machine comprises the machine according to embodiment F1, wherein the propulsion controller is configured to control speed and rotational direction of each wheel of the set of wheels independently, thereby controlling both speed and direction of the housing over the ground surface.

In embodiment F3, a machine comprises the machine according to any preceding F embodiment, wherein the controller of the navigation system is further configured to display a representation of the one or more paths to a user via a user interface device before defining the one or more boundaries in the navigational map.

In embodiment F4, a machine comprises the machine according to any preceding F embodiment, wherein the controller of the vision system is further configured to, in response to determining that a quality level of the three-dimensional point cloud does not meet a quality threshold, record a new set of touring images for one or more areas of the work region associated with one or more low-quality portions of the three-dimensional point cloud.

In embodiment F5, a machine comprises the machine according to any preceding F embodiment, wherein the controller of the navigation system is further configured to test the navigation map by autonomous operation of the autonomous machine within the work region based on the navigation map.

In embodiment F6, a machine comprises the machine according to any preceding F embodiment, wherein the controller of the navigation system is configured to operatively connect to a user interface device for the touring phase or the mapping phase.

Thus, various embodiments of autonomous machine navigation and training using a vision system are disclosed. Although reference is made herein to the accompanying set of drawings that form part of this disclosure, one of at least ordinary skill in the art will appreciate that various adaptations and modifications of the embodiments described herein are within, or do not depart from, the scope of this disclosure. For example, aspects of the embodiments described herein may be combined in a variety of ways with each other. Therefore, it is to be understood that, within the scope of the appended claims, the claimed invention may be practiced other than as explicitly described herein.

All references and publications cited herein are expressly incorporated herein by reference in their entirety into this disclosure, except to the extent they may directly contradict this disclosure.

All scientific and technical terms used herein have meanings commonly used in the art unless otherwise specified. The definitions provided herein are to facilitate understanding of certain terms used frequently herein and are not meant to limit the scope of the present disclosure.

The recitation of numerical ranges by endpoints includes all numbers subsumed within that range (e.g. 1 to 5 includes 1, 1.5, 2, 2.75, 3, 3.80, 4, and 5) and any range within that range. Herein, the terms "up to" or "no greater than" a number (e.g., up to 50) includes the number (e.g., 50), and the term "no less than" a number (e.g., no less than 5) includes the number (e.g., 5).

The terms "coupled" or "connected" refer to elements being attached to each other either directly (in direct contact with each other) or indirectly (having one or more elements between and attaching the two elements). Either term may be modified by "operatively" and "operably," which may be used interchangeably, to describe that the coupling or connection is configured to allow the components to interact to carry out at least some functionality (for example, a propulsion controller may be operably coupled to a motor driver to electrically control operation of the motor).

Reference to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout are not necessarily referring to the same embodiment of the disclosure. Furthermore, the particular features, configurations, compositions, or characteristics may be combined in any suitable manner in one or more embodiments.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

What is claimed is:

1. A method for autonomous machine navigation comprising:
    determining a current pose of an autonomous machine based on non-vision-based pose data captured by one or more non-vision-based sensors of the autonomous machine, wherein the pose represents one or both of a position and an orientation of the autonomous machine in a work region defined by one or more boundaries that are taught to the autonomous machine in a training mode initiated by a user of the autonomous machine;
    determining vision-based pose data based on two-dimensional (2D) image data captured by the autonomous machine; and
    updating the current pose based on the vision-based pose data to correct or localize the current pose and to provide an updated pose of the autonomous machine in the work region for navigating the autonomous machine in the work region.

2. The method according to claim 1, wherein determining the vision-based pose data comprises matching the 2D image data to one or more points of a three-dimensional point cloud (3DPC) that represents the work region.

3. The method according to claim 2, further comprising:
    capturing 2D training image data using the autonomous machine;
    generating the 3DPC based on:
        feature data that contains two-dimensional features extracted from the 2D training image data; and
        matching data that relates features in the feature data from different training images of the 2D training image data.

4. The method according to claim 3, wherein the 3DPC is generated or regenerated during an offline mode of the autonomous machine while operably coupled to a base station for charging.

5. The method according to claim 2, further comprising registering a coordinate system of the 3DPC to a real-world scale and orientation in a navigation map.

6. The method according to claim 5, further comprising autonomously operating the autonomous machine in the work region based on the navigation map.

7. The method according to claim 6, further comprising testing the navigation map by navigating the autonomous machine within the work region based on the navigation map before autonomously operating the autonomous machine in the work region.

8. The method according to claim 1, wherein the training mode comprises:
    recording a set of 2D touring images associated with the autonomous machine traversing one or both of a perimeter and an interior of the work region to provide training image data;
    generating a three-dimensional point cloud (3DPC) based on the set of 2D touring images;
    determining a set of 2D mapping images after generating the 3DPC; and
    determining the one or more boundaries of the work region based on the set of 2D mapping images and the 3DPC.

9. The method according to claim 8, further comprising determining whether a quality level of the 3DPC does not meet a quality threshold before determining the set of 2D mapping images.

10. The method according to claim 9, further comprising:
    recording a new set of 2D touring images in the work region in response to determining that the quality level of the 3DPC does not meet the quality threshold; and
    regenerating the 3DPC based on the new set of 2D touring images.

11. The method according to claim 8, wherein recording the set of 2D touring images comprises recording the set of 2D touring images while traversing the work region with the autonomous machine in a zig-zag or raster pattern.

12. The method according to claim 1, further comprising recording a new set of 2D image data periodically.

13. The method according to claim 1, wherein:
    the work region is an outdoor area;
    the autonomous machine is a grounds maintenance machine; or
    the work region is a lawn and the autonomous machine is a lawn maintenance machine.

14. The method according to claim 1, wherein the one or more boundaries of the work region are used to define one or more of a perimeter of the work region, a containment zone in the work region, an exclusion zone in the work region, or a transit zone in the work region.

15. The method according to claim 1, wherein each pose represents one or both of a three-dimensional position and a three-dimensional orientation of the autonomous machine.

16. The method according to claim 1, further comprising determining the one or more boundaries of the work region based on the non-vision-based pose data and the vision-based pose data for subsequent navigation of the autonomous machine in the work region.

17. The method according to claim 1, wherein determining the current pose of the autonomous machine based on the non-vision-based pose data is repeated at a first rate and updating the current pose based on the vision-based pose data is repeated at a second rate slower than the first rate.

18. The method according to claim 1, wherein the non-vision-based pose data comprises one or both of an inertial measurement data and wheel encoding data.

19. The method according to claim 1, wherein determining the vision-based pose data is based at least in part on feedback from vision-based pose estimation or vision-based pose filtering.

20. A method of navigation training for an autonomous machine comprising:
    directing the autonomous machine by a user during a touring phase of a training mode along at least one of a perimeter and an interior of a work region to record at least one of a first set of two-dimensional (2D) touring images associated with the perimeter and a second set of 2D touring images associated with the interior;
    generating, during an offline mode, a three-dimensional point cloud (3DPC) based on at least one of the first set and the second set of 2D touring images; and
    directing the autonomous machine during a mapping phase of the training mode along one or more paths to record sensor fusion data to define one or more boundaries for the work region in a navigational map using the 3DPC.

21. The method according to claim 20, wherein directing the autonomous machine during the mapping phase of the training mode along the one or more paths comprises:
    evaluating at least one of the one or more boundaries defined based on the sensor fusion data;
    determining whether the at least one boundary satisfies a path criterion; and
    displaying a status of the mapping phase based on whether the at least one boundary satisfies the path criterion.

22. The method according to claim 21, wherein displaying the status of the mapping phase occurs during traversal of the at least one boundary of the work region.

23. The method according to claim 21, wherein the path criterion comprises at least one of: whether the at least one boundary defines a bounded area; and whether bottlenecks exist in the at least one boundary.

24. The method according to claim 20, further comprising:
    directing the autonomous machine, in response to determining that a quality level of the 3DPC does not meet a quality threshold, to record a new set of 2D touring images for one or more areas of the work region associated with one or more low-quality portions of the 3DPC; and
    regenerating during the offline mode the 3DPC based on at the new set of 2D touring images.

25. The method according to claim 24, further comprising deploying one or more artificial features detectable by a sensor of the autonomous machine along the one or more areas of the work region associated with the one or more low-quality portions of the 3DPC before directing the autonomous machine to record the new set of 2D touring images.

26. The method according to claim 20, further comprising displaying a representation of the one or more paths to the user before defining the one or more boundaries in the navigational map.

27. The method according to claim 26, wherein the representation associated with each path is based on an outer perimeter of the respective path.

28. An autonomous machine comprising:
    a housing coupled to a maintenance implement;
    a set of wheels supporting the housing over a ground surface;
    a propulsion controller operably coupled to the set of wheels;
    a vision system comprising at least one camera adapted to capture image data; and
    a navigation system operably coupled to the vision system and the propulsion controller, the navigation system adapted to:
        determine a current pose of the autonomous machine based on non-vision-based pose data captured by one or more non-vision-based sensors of the autonomous machine, wherein the pose represents one or both of a position and an orientation of the autonomous machine in a work region defined by one or more boundaries that are taught to the autonomous machine in a user-initiated training session;
        determining vision-based pose data based on image data captured by the at least one camera;
        updating the current pose based on the vision-based pose data to correct or localize the current pose and to provide an updated pose of the autonomous machine in the work region for navigating the autonomous machine in the work region; and
        direct the autonomous machine within the work region.

* * * * *